US012327948B2

(12) United States Patent
Pepe

(10) Patent No.: US 12,327,948 B2
(45) Date of Patent: Jun. 10, 2025

(54) HIGH DENSITY COUPLING PANEL

(71) Applicant: COMMSCOPE TECHNOLOGIES LLC, Hickory, NC (US)

(72) Inventor: Paul John Pepe, Clemmons, NC (US)

(73) Assignee: CommScope Technologies LLC, Claremont, NC (US)

( * ) Notice: Subject to any disclaimer, the term of this patent is extended or adjusted under 35 U.S.C. 154(b) by 248 days.

(21) Appl. No.: 17/765,107

(22) PCT Filed: Sep. 29, 2020

(86) PCT No.: PCT/US2020/053274
§ 371 (c)(1),
(2) Date: Mar. 30, 2022

(87) PCT Pub. No.: WO2021/067268
PCT Pub. Date: Apr. 8, 2021

(65) Prior Publication Data

US 2022/0384984 A1 Dec. 1, 2022

Related U.S. Application Data

(60) Provisional application No. 62/908,355, filed on Sep. 30, 2019.

(51) Int. Cl.
*H01R 13/518* (2006.01)
*H01R 13/6586* (2011.01)
*H01R 13/6589* (2011.01)

(52) U.S. Cl.
CPC ....... *H01R 13/518* (2013.01); *H01R 13/6586* (2013.01); *H01R 13/6589* (2013.01)

(58) Field of Classification Search
CPC .............. H01R 13/518; H01R 13/6586; H01R 13/6589
(Continued)

(56) References Cited

U.S. PATENT DOCUMENTS 2,673,968 A 3/1954 Smith
2,813,257 A 11/1957 Cornell, Jr.
(Continued)

FOREIGN PATENT DOCUMENTS

CN 1408135 A 4/2003
CN 1977428 A 6/2007
(Continued)

OTHER PUBLICATIONS

Extended European Search Report for Application No. 20871913.8 mailed Jan. 29, 2024.
(Continued)

*Primary Examiner* — Gary F Paumen
(74) *Attorney, Agent, or Firm* — Merchant & Gould P.C.

(57) ABSTRACT

A high density coupling panel of the present disclosure presents a compact grouping of coupler wherein each of the couplers couples a first free connector with a second free connector wherein each of the free connectors is coupled to exactly two electrical conductors. The high density coupling panel can be manufactured in a shielded (e.g., metal) or non-shielded (e.g. non-metal) form as appropriate to a specific application. In the shielded configuration, a bonding strip is used to connect all metal components (e.g., shielded free connectors, shielded couplers, and metal panel of the high density coupling panel) to ground via a shielding tab.

16 Claims, 19 Drawing Sheets

(58) Field of Classification Search
USPC .................................................. 439/540.1, 95
See application file for complete search history.

(56) References Cited

U.S. PATENT DOCUMENTS

| | | | |
|---|---|---|---|
| 3,199,060 | A | 8/1965 | Marasco |
| 3,827,007 | A | 7/1974 | Fairbairn et al. |
| 3,828,706 | A | 8/1974 | Scott |
| 4,054,350 | A | 10/1977 | Hardesty |
| 4,449,767 | A | 5/1984 | Weidler |
| 4,458,971 | A | 7/1984 | D'Urso et al. |
| 4,565,416 | A | 1/1986 | Rudy et al. |
| 4,702,538 | A | 10/1987 | Hutter et al. |
| 4,743,208 | A | 5/1988 | Weisenburger |
| 4,744,774 | A | 5/1988 | Pauza |
| 4,824,394 | A | 4/1989 | Roath et al. |
| 4,917,625 | A | 4/1990 | Haile |
| 4,932,906 | A | 6/1990 | Kaley et al. |
| 5,013,255 | A | 5/1991 | Juret et al. |
| 5,014,407 | A | 5/1991 | Boughten et al. |
| 5,240,436 | A | 8/1993 | Bradley et al. |
| 5,317,663 | A | 5/1994 | Beard et al. |
| 5,368,499 | A | 11/1994 | Hirt |
| 5,385,476 | A | 1/1995 | Jasper |
| 5,496,184 | A | 3/1996 | Garrett et al. |
| 5,504,654 | A | 4/1996 | Knox et al. |
| 5,533,915 | A | 7/1996 | Deans |
| 5,580,264 | A | 12/1996 | Aoyama et al. |
| 5,647,119 | A | 7/1997 | Bourbeau et al. |
| 5,692,080 | A | 11/1997 | Lu |
| 5,732,174 | A | 3/1998 | Carpenter et al. |
| 5,748,819 | A | 5/1998 | Szentesi et al. |
| 5,749,755 | A | 5/1998 | Genta et al. |
| 5,833,496 | A | 11/1998 | Hollander et al. |
| 5,897,404 | A | 4/1999 | Goodman et al. |
| 5,915,989 | A | 6/1999 | Adriaenssens et al. |
| 5,984,703 | A | 11/1999 | Weingartner |
| 5,989,057 | A | 11/1999 | Gerke et al. |
| 6,019,521 | A | 2/2000 | Manning et al. |
| 6,045,389 | A | 4/2000 | Ferrill et al. |
| 6,050,845 | A | 4/2000 | Smalley, Jr. et al. |
| 6,065,994 | A | 5/2000 | Hashim et al. |
| 6,135,804 | A | 10/2000 | Lux |
| 6,217,230 | B1 | 4/2001 | Matsushita |
| 6,254,440 | B1 | 7/2001 | Ko et al. |
| 6,270,372 | B1 | 8/2001 | Jenner et al. |
| 6,272,738 | B1 | 8/2001 | Holliday et al. |
| 6,280,230 | B1 | 8/2001 | Takase et al. |
| 6,305,950 | B1 | 10/2001 | Doorhy |
| 6,371,793 | B1 | 4/2002 | Doorhy et al. |
| 6,390,687 | B1 | 5/2002 | Shirakawa |
| 6,402,571 | B1 | 6/2002 | Muller et al. |
| 6,410,845 | B2 | 6/2002 | Reede |
| 6,488,550 | B1 | 12/2002 | Kikuchi et al. |
| 6,499,889 | B1 | 12/2002 | Shirakawa et al. |
| 6,535,682 | B1 | 3/2003 | Puetz et al. |
| 6,568,967 | B2 | 5/2003 | Inaba et al. |
| 6,572,276 | B1 | 6/2003 | Theis et al. |
| 6,641,431 | B2 | 11/2003 | Saitoh |
| 6,648,673 | B2 | 11/2003 | Watanabe |
| 6,702,617 | B1 | 3/2004 | Clement et al. |
| 6,729,901 | B2 | 5/2004 | Aekins |
| 6,805,577 | B2 | 10/2004 | Murakami et al. |
| 6,988,914 | B2 | 1/2006 | Pepe et al. |
| 7,004,797 | B2 | 2/2006 | Harada et al. |
| 7,118,423 | B2 | 10/2006 | Kobayashi et al. |
| 7,131,864 | B2 | 11/2006 | Peng |
| 7,153,156 | B1 | 12/2006 | Malstrom |
| 7,201,601 | B2 | 4/2007 | Lappohn |
| 7,217,162 | B2 | 5/2007 | Harada et al. |
| 7,278,854 | B1 | 10/2007 | Robinette et al. |
| 7,291,046 | B2 | 11/2007 | Russelburg |
| 7,294,024 | B2 | 11/2007 | Hammond, Jr. et al. |
| 7,318,272 | B1 | 1/2008 | Steiner et al. |
| 7,325,976 | B2 | 2/2008 | Gurreri et al. |
| 7,537,393 | B2 | 5/2009 | Anderson et al. |
| 7,559,789 | B2 | 7/2009 | Hashim |
| 7,618,262 | B2 | 11/2009 | Fogg et al. |
| 7,618,297 | B2 | 11/2009 | Wang |
| 7,690,941 | B2 | 4/2010 | Caveney et al. |
| 7,867,033 | B2 | 1/2011 | Kumagai et al. |
| 7,909,622 | B2 * | 3/2011 | Pepe .................... H01R 13/516 439/607.02 |
| 7,955,112 | B2 | 6/2011 | Yang et al. |
| 8,006,372 | B2 | 8/2011 | Caveney et al. |
| 8,052,482 | B1 | 11/2011 | Lin |
| 8,109,789 | B2 | 2/2012 | Tyler |
| 8,113,889 | B2 | 2/2012 | Zhang et al. |
| 8,172,468 | B2 | 5/2012 | Jones et al. |
| 8,303,337 | B2 | 11/2012 | Ballard et al. |
| 8,382,382 | B2 | 2/2013 | Nelson |
| 8,454,378 | B2 | 6/2013 | Osterhart et al. |
| 8,684,763 | B2 | 4/2014 | Mattson et al. |
| 8,690,596 | B2 | 4/2014 | Su et al. |
| 8,715,016 | B2 | 5/2014 | DeBock et al. |
| 8,757,895 | B2 | 6/2014 | Petersen |
| 8,821,031 | B2 | 9/2014 | Lin et al. |
| 8,839,506 | B2 | 9/2014 | Slater et al. |
| 8,840,424 | B2 | 9/2014 | Kudo |
| 8,888,535 | B2 | 11/2014 | Knight et al. |
| 8,911,260 | B2 | 12/2014 | Golko et al. |
| 8,915,759 | B2 | 12/2014 | Miyamoto |
| 8,952,703 | B2 | 2/2015 | Font Aranega et al. |
| 8,979,572 | B2 | 3/2015 | Mochizuki |
| 8,979,574 | B2 | 3/2015 | Daily, Jr. et al. |
| 8,987,933 | B2 | 3/2015 | Yu |
| 9,077,106 | B2 | 7/2015 | Suzuki |
| 9,093,807 | B2 | 7/2015 | O'Connor et al. |
| 9,112,293 | B2 | 8/2015 | Suzuki |
| 9,136,652 | B2 | 9/2015 | Ngo |
| 9,172,169 | B2 | 10/2015 | Hagio et al. |
| 9,209,578 | B2 | 12/2015 | Mochizuki |
| 9,293,877 | B2 | 3/2016 | Wong et al. |
| 9,306,313 | B2 | 4/2016 | Heggemann et al. |
| 9,343,822 | B2 | 5/2016 | Sparrowhawk et al. |
| 9,356,439 | B2 | 5/2016 | Keith et al. |
| 9,366,829 | B2 | 6/2016 | Czosnowski et al. |
| 9,490,591 | B2 | 11/2016 | Yamashita et al. |
| 9,590,339 | B2 | 3/2017 | Oberski et al. |
| 9,599,776 | B2 | 3/2017 | Shimakawa |
| 9,634,417 | B2 | 4/2017 | Ramanna et al. |
| 9,685,726 | B2 | 6/2017 | Ang et al. |
| 9,692,161 | B2 | 6/2017 | Lindkamp et al. |
| 9,799,981 | B2 | 10/2017 | Weber |
| 9,853,388 | B2 | 12/2017 | Copper et al. |
| 9,917,390 | B1 | 3/2018 | Bianca et al. |
| 9,972,932 | B2 | 5/2018 | Copper et al. |
| 10,061,090 | B2 | 8/2018 | Coenegracht |
| 10,069,269 | B2 | 9/2018 | Takahashi |
| 10,164,383 | B2 | 12/2018 | Feng |
| 10,389,062 | B2 | 8/2019 | Zebhauser et al. |
| 10,403,996 | B2 | 9/2019 | Pan et al. |
| 10,411,409 | B2 | 9/2019 | Hashim et al. |
| 10,502,904 | B2 | 12/2019 | Yang |
| 10,535,969 | B2 | 1/2020 | Sutter |
| 10,665,974 | B2 | 5/2020 | Oberski et al. |
| 10,665,985 | B2 | 5/2020 | Keith et al. |
| 10,727,626 | B2 | 7/2020 | Murray |
| 10,768,374 | B2 | 9/2020 | Gurreri et al. |
| 10,950,962 | B2 | 3/2021 | Schmidbauer et al. |
| 10,998,685 | B2 | 5/2021 | Curtis et al. |
| 11,031,719 | B2 | 6/2021 | Somanathapura Ramanna |
| 11,271,350 | B2 | 3/2022 | Moffitt et al. |
| 11,296,463 | B2 | 4/2022 | Keith et al. |
| 11,362,463 | B2 | 6/2022 | Tobey et al. |
| 11,394,132 | B2 | 7/2022 | Ohfuku et al. |
| 11,652,319 | B2 | 5/2023 | Pepe et al. |
| 11,652,322 | B2 | 5/2023 | Keith et al. |
| 2001/0018287 | A1 | 8/2001 | Reichle |
| 2002/0055294 | A1 | 5/2002 | Murakami et al. |
| 2002/0072275 | A1 | 6/2002 | Arai |
| 2003/0017740 | A1 | 1/2003 | Watanabe |
| 2004/0152360 | A1 | 8/2004 | Harris et al. |
| 2004/0266255 | A1 | 12/2004 | Lee |

(56) References Cited

U.S. PATENT DOCUMENTS

| | | | |
|---|---|---|---|
| 2005/0227545 | A1 | 10/2005 | Lahoreau et al. |
| 2005/0232566 | A1 | 10/2005 | Rapp et al. |
| 2005/0277335 | A1 | 12/2005 | Gordon et al. |
| 2006/0134966 | A1 | 6/2006 | Lappohn |
| 2006/0189215 | A1 | 8/2006 | Ellis et al. |
| 2007/0270043 | A1 | 11/2007 | Pepe et al. |
| 2007/0287332 | A1 | 12/2007 | Gordon et al. |
| 2008/0057793 | A1 | 3/2008 | Gerber et al. |
| 2008/0183359 | A1 | 7/2008 | Sawada |
| 2009/0149061 | A1 | 6/2009 | Zhang |
| 2009/0176415 | A1 | 7/2009 | AbuGhazaleh et al. |
| 2009/0269954 | A1 | 10/2009 | Loch et al. |
| 2010/0003863 | A1 | 1/2010 | Siemon et al. |
| 2010/0035454 | A1 | 2/2010 | Morgan et al. |
| 2010/0040332 | A1 | 2/2010 | Van Den Meersschaut et al. |
| 2010/0041273 | A1 | 2/2010 | Scherer et al. |
| 2010/0071202 | A1 | 3/2010 | Peng et al. |
| 2010/0120284 | A1 | 5/2010 | Oka et al. |
| 2010/0173528 | A1 | 7/2010 | Martich et al. |
| 2010/0221951 | A1 | 9/2010 | Pepe et al. |
| 2010/0304600 | A1 | 12/2010 | Busse |
| 2010/0319963 | A1 | 12/2010 | James et al. |
| 2011/0097942 | A1 | 4/2011 | Dooley et al. |
| 2011/0143602 | A1 | 6/2011 | Niitsu |
| 2011/0286702 | A1 | 11/2011 | Nielson et al. |
| 2011/0294342 | A1 | 12/2011 | DeBock et al. |
| 2012/0004655 | A1 | 1/2012 | Kim et al. |
| 2012/0204417 | A1 | 8/2012 | Stull |
| 2013/0075149 | A1 | 3/2013 | Golko et al. |
| 2013/0090014 | A1 | 4/2013 | Champion |
| 2013/0171885 | A1 | 7/2013 | Zhang |
| 2013/0189873 | A1 | 7/2013 | Maranto et al. |
| 2013/0252469 | A1 | 9/2013 | Mochizuki |
| 2013/0252483 | A1 | 9/2013 | Mochizuki |
| 2013/0286896 | A1 | 10/2013 | Selph et al. |
| 2014/0038462 | A1 | 2/2014 | Coffey et al. |
| 2014/0094059 | A1 | 4/2014 | Pepe et al. |
| 2014/0213119 | A1 | 7/2014 | Thackston et al. |
| 2015/0083455 | A1 | 3/2015 | Keith et al. |
| 2015/0144395 | A1 | 5/2015 | Tanaka |
| 2015/0155670 | A1 | 6/2015 | Gardner |
| 2015/0207254 | A1 | 7/2015 | Kamei et al. |
| 2015/0214667 | A1 | 7/2015 | Chen et al. |
| 2015/0249295 | A1 | 9/2015 | Tseng |
| 2016/0028198 | A1 | 1/2016 | Yamashita et al. |
| 2016/0093984 | A1 | 3/2016 | Iwamoto |
| 2016/0131858 | A1 | 5/2016 | Anderson et al. |
| 2016/0141790 | A1 | 5/2016 | Martin et al. |
| 2016/0164223 | A1 | 6/2016 | Zebhauser et al. |
| 2016/0192527 | A1 | 6/2016 | Anderson et al. |
| 2016/0294111 | A1 | 10/2016 | Kobayashi et al. |
| 2016/0315436 | A1 | 10/2016 | Plamondon et al. |
| 2016/0344139 | A1 | 11/2016 | O'Young et al. |
| 2017/0077966 | A1 | 3/2017 | Chen et al. |
| 2017/0184798 | A1 | 6/2017 | Coenegracht |
| 2017/0207561 | A1 | 7/2017 | Scherer et al. |
| 2017/0264025 | A1 | 9/2017 | Lappöhn |
| 2017/0373405 | A1 | 12/2017 | Lappoehn |
| 2018/0287312 | A1 | 10/2018 | De Dios Martin et al. |
| 2018/0358739 | A1 | 12/2018 | De Dios Martin |
| 2019/0154923 | A1 | 5/2019 | Flaig |
| 2019/0296491 | A1 | 9/2019 | Maesoba et al. |
| 2020/0036130 | A1 | 1/2020 | Fontaine et al. |
| 2020/0106216 | A1 | 4/2020 | Hashim et al. |
| 2020/0153174 | A1 | 5/2020 | Curtis et al. |
| 2020/0274273 | A1 | 8/2020 | Oberski et al. |
| 2020/0350730 | A1 | 11/2020 | Keith et al. |
| 2021/0083441 | A1 | 3/2021 | Moffitt et al. |
| 2021/0104842 | A1 | 4/2021 | Keith et al. |
| 2021/0104843 | A1 | 4/2021 | Tobey et al. |
| 2021/0151905 | A1 | 5/2021 | Novak et al. |
| 2021/0194179 | A1 | 6/2021 | Pepe et al. |
| 2021/0378834 | A1 | 12/2021 | Kleiner |
| 2022/0158389 | A1 | 5/2022 | Pepe et al. |
| 2022/0278476 | A1 | 9/2022 | Pepe et al. |
| 2022/0360033 | A1 | 11/2022 | Pepe et al. |
| 2023/0071501 | A1 | 3/2023 | Tobey et al. |
| 2023/0238757 | A1 | 7/2023 | Pepe et al. |

FOREIGN PATENT DOCUMENTS

| | | | |
|---|---|---|---|
| CN | 102055115 | A | 5/2011 |
| CN | 102136649 | A | 7/2011 |
| CN | 103311746 | A | 9/2013 |
| CN | 104428958 | A | 3/2015 |
| CN | 105789965 | A | 7/2016 |
| CN | 106415944 | A | 2/2017 |
| CN | 107104329 | A | 8/2017 |
| CN | 209167592 | U | 7/2019 |
| DE | 102 16 915 | A1 | 10/2003 |
| EP | 1 128 494 | A2 | 8/2001 |
| EP | 1 783 871 | A1 | 5/2007 |
| EP | 1988611 | B1 | 8/2010 |
| EP | 2862364 | B1 | 5/2016 |
| EP | 3 091 614 | A1 | 11/2016 |
| FR | 2 290 136 | A7 | 5/1976 |
| GB | 628 419 | A | 8/1949 |
| GB | 2510490 | A | 8/2014 |
| JP | 2000-67979 | A | 3/2000 |
| JP | 4514356 | B2 | 5/2010 |
| JP | 2014-38847 | A | 2/2014 |
| KR | 10-2010-0122766 | A | 11/2010 |
| KR | 10-2011-0020262 | A | 3/2011 |
| WO | 2006/048867 | A1 | 5/2006 |
| WO | 2006/138301 | A2 | 12/2006 |
| WO | 2011/163260 | A1 | 12/2011 |
| WO | 2015/058345 | A1 | 4/2015 |
| WO | 2016/132855 | A1 | 8/2016 |
| WO | 2017/019370 | A1 | 2/2017 |
| WO | 2017/152108 | A1 | 9/2017 |
| WO | 2018/200528 | A1 | 11/2018 |
| WO | 2018/227057 | A1 | 12/2018 |
| WO | 2018/236875 | A1 | 12/2018 |
| WO | 2019/147774 | A1 | 8/2019 |
| WO | 2019/165466 | A1 | 8/2019 |
| WO | 2019/180640 | A1 | 9/2019 |
| WO | 2020/051340 | A1 | 3/2020 |
| WO | 2020/190758 | A1 | 9/2020 |
| WO | 2021/067274 | A1 | 4/2021 |
| WO | 2021/252938 | A1 | 12/2021 |
| WO | 2022/006544 | A1 | 1/2022 |
| WO | 2022/006549 | A1 | 1/2022 |

OTHER PUBLICATIONS

DiBiaso et al., "Designing a Connection System for Gigabit Automotive Ethernet," SAE International Journal of Passenger Cars—Electronic and Electrical Systems, vol. 9, No. 1, pp. 134-146 (May 2016).

2-Pin Connector w/Header, .10", All Electronics Corporation, 3 pages, downloaded: http://www.allelctronics.com/item/con-242/2-pin-connector-w/header-.10/html (May 31, 2017).

2 Pin Connectors, Wiring Specialties, 5 pages (May 31, 2017).

International Search Report and Written Opinion of the International Searching Authority for International Patent Application No. PCT/US2020/053274 mailed Jan. 15, 2021, 14 pages.

Bapat, "On the design and analysis of compliant mechanisms using the pseudo-rigid-body model concept." Retrieved from the Internet: <https://scholarsmine.mst.edu/cgi/viewcontent.cgi?article=3378&context=doctoral_dissertations>. Doctoral Dissertation, Missouri University of Science and Technology, 295 pages (2015).

Her, "Methodology for Compliant Mechanisms Design" Thesis, Purdue University, 196 pages (Dec. 1986).

Koli, "A generalized approach for compliant mechanism design using the synthesis with compliance method, with experimental validation." Retrieved from the Internet: <URL: https://scholarsmine.mst.edu/cgi/viewcontent.cgi?article=8098&context=masters_

(56) References Cited

OTHER PUBLICATIONS theses>. Masters Thesis, Missouri University of Science and Technology, 155 pages (2013).

* cited by examiner

HIGH DENSITY COUPLING PANEL

CROSS-REFERENCE TO RELATED APPLICATION

This application is a National Stage Application of PCT/US2020/053274, filed on Sep. 29, 2020, which claims the benefit of U.S. Patent Application Ser. No. 62/908,355, filed on Sep. 30, 2019, the disclosures of which is are incorporated herein by reference in their entireties. To the extent appropriate, a claim of priority is made to each of the above disclosed applications.

TECHNICAL FIELD

The present disclosure is directed to high density coupling panels and, more specifically, to high density panels incorporating couplers that electrically couple pairs of connectors; each connector coupled to a singled twisted pair of conductors.

BACKGROUND

A single twisted pair of conductors can be used to transmit data and/or power over a communications network that includes, for example, computers, servers, cameras, televisions, and other electronic devices including those on the internet of things (IoT), etc. In the past, this has been performed through use of Ethernet cables and connectors that typically include four pairs of conductors that are used to transmit four differential signals. Differential signaling techniques, where each signal is transmitted over a balanced pair of conductors, are used because differential signals may be affected less by external noise sources and internal noises sources such as crosstalk as compared to signals that are transmitted over unbalanced conductors.

In Ethernet cables, the insulated conductors of each differential pair are tightly twisted about each other to form four twisted pairs of conductors, and these four twisted pairs may be further twisted about each other in a so-called "core twist." A separator may be provided that is used to separate (and hence reduce coupling between) at least one of the twisted pairs from at least one other of the twisted pairs. The four twisted pairs and any separator may be enclosed in a protective jacket. Ethernet cables are connectorized with Ethernet connectors; a single Ethernet connector is configured to accommodate all four twisted pairs of conductors. However, it is possible that data and/or power transfer can be effectively supported through a singled twisted pair of conductors with its own more compact connector and cable. Couplers that can enable electrical coupling of connectors, with each connector coupled to a single pair of electrical conductors, are an important element in broadening the use of data and/or power transfer over a single pair of electrical conductors. A further element in broadening the use of data and/or power transfer over a single pair of electrical conductors is a high density coupling panel.

SUMMARY

A high density coupling panel of the present disclosure presents a compact grouping of coupler wherein each of the couplers couples a first free connector with a second free connector wherein each of the free connectors is coupled to exactly two electrical conductors. The high density coupling panel can be manufactured in a shielded (e.g., metal) or non-shielded (e.g. non-metal) form as appropriate to a specific application. In the shielded configuration, a bonding strip is used to connect all metal components (e.g., shielded free connectors, shielded couplers, and metal panel of the high density coupling panel) to ground via a shielding tab.

In certain aspects, the present disclosure is directed to a high density coupling panel that includes a panel module, a coupler, a metal panel and a bonding strip. The panel module includes a plurality of channels. A shielded coupler is inserted within each of the plurality of channels and each coupler includes exactly one pair of electrical and data coupling contacts. The metal panel receives the panel module and a bonding strip electrically couples the metal panel and shield couplers to a shielding tab that is coupled to ground.

Another aspect of the present disclosure is directed to a method of assembling a high density coupling panel, including inserting a panel module, that includes a plurality of channels, into a panel until the panel module is releasably secured therein and inserting into each of the plurality of channels a coupler, which includes exactly two electrical and data coupling contacts, until the coupler is releasably secured therein.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

The present disclosure is directed to a high density coupling panel. The high density coupling panel generally comprises a metal panel, a plurality of panel modules and a metal bonding strip. Each of the plurality of panel modules includes a plurality of channels into which are inserted shielded couplers. The couplers are configured to couple shielded first and second free connectors, each of which is coupled to exactly two metal conductors that both conduct electricity and transmit data. The panel modules are inserted into the panel, the couplers are inserted into the channels of the panel modules, and a bonding strip operates to electrically couple the couplers (and free connectors coupled thereby) and the panel to a shielding tab to provide a grounded configuration.

Figure 1A:
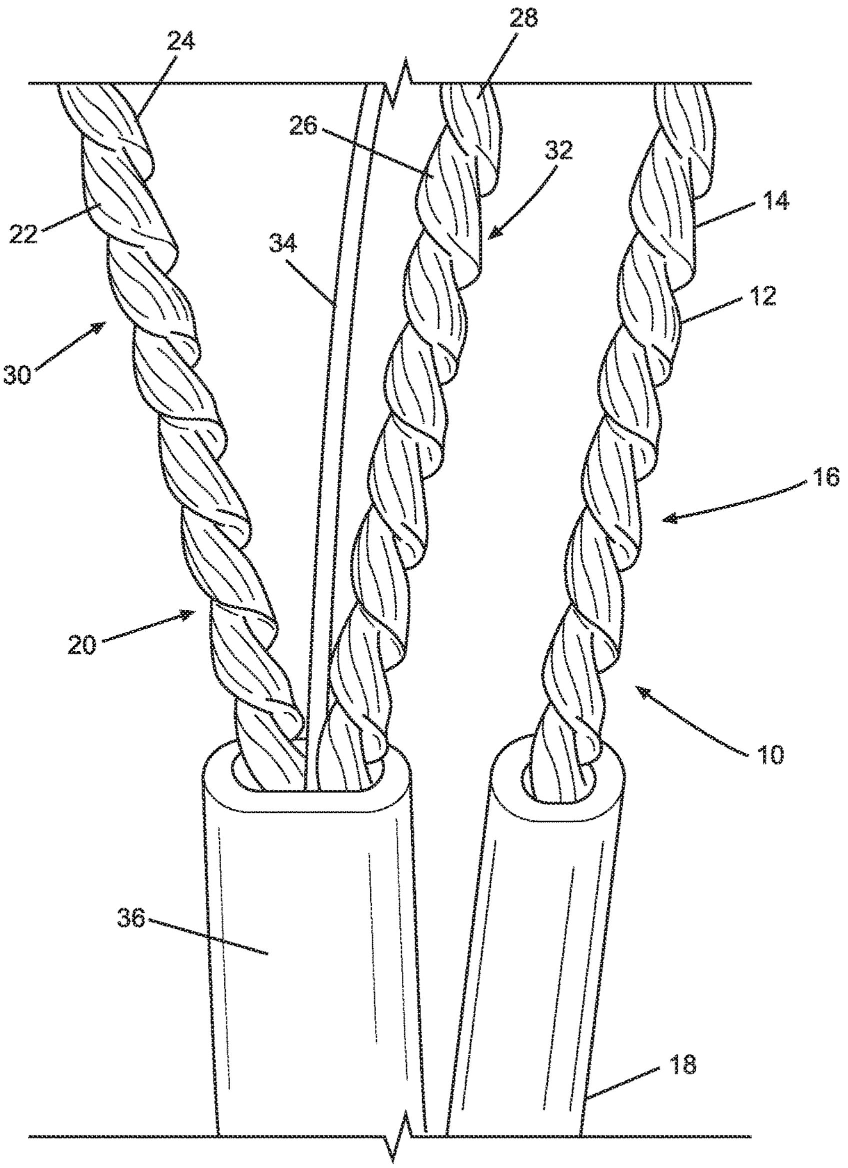
FIGS. 1A-1B illustrate example embodiments of cables having single twisted pairs of conductors.
Figure 1B:
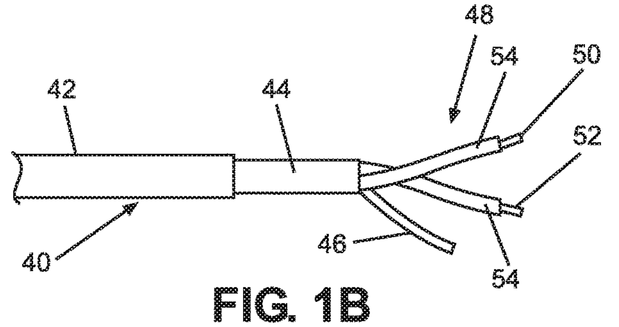
Figure 2A:
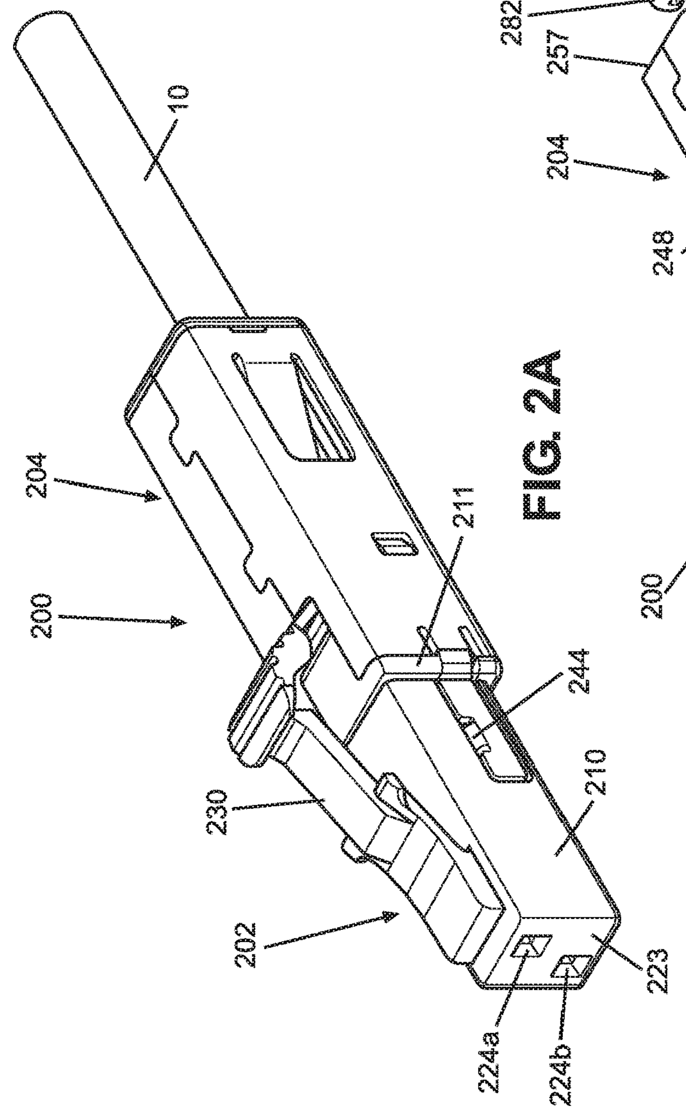
FIGS. 2A-2D illustrate an example embodiment of a free connector for a single pair of electrical conductors including an assembled view, an exploded assembly view, a cross section of a forward connector body of the connector and a pair of electrical contacts of the connector, respectively.
Figure 2B:
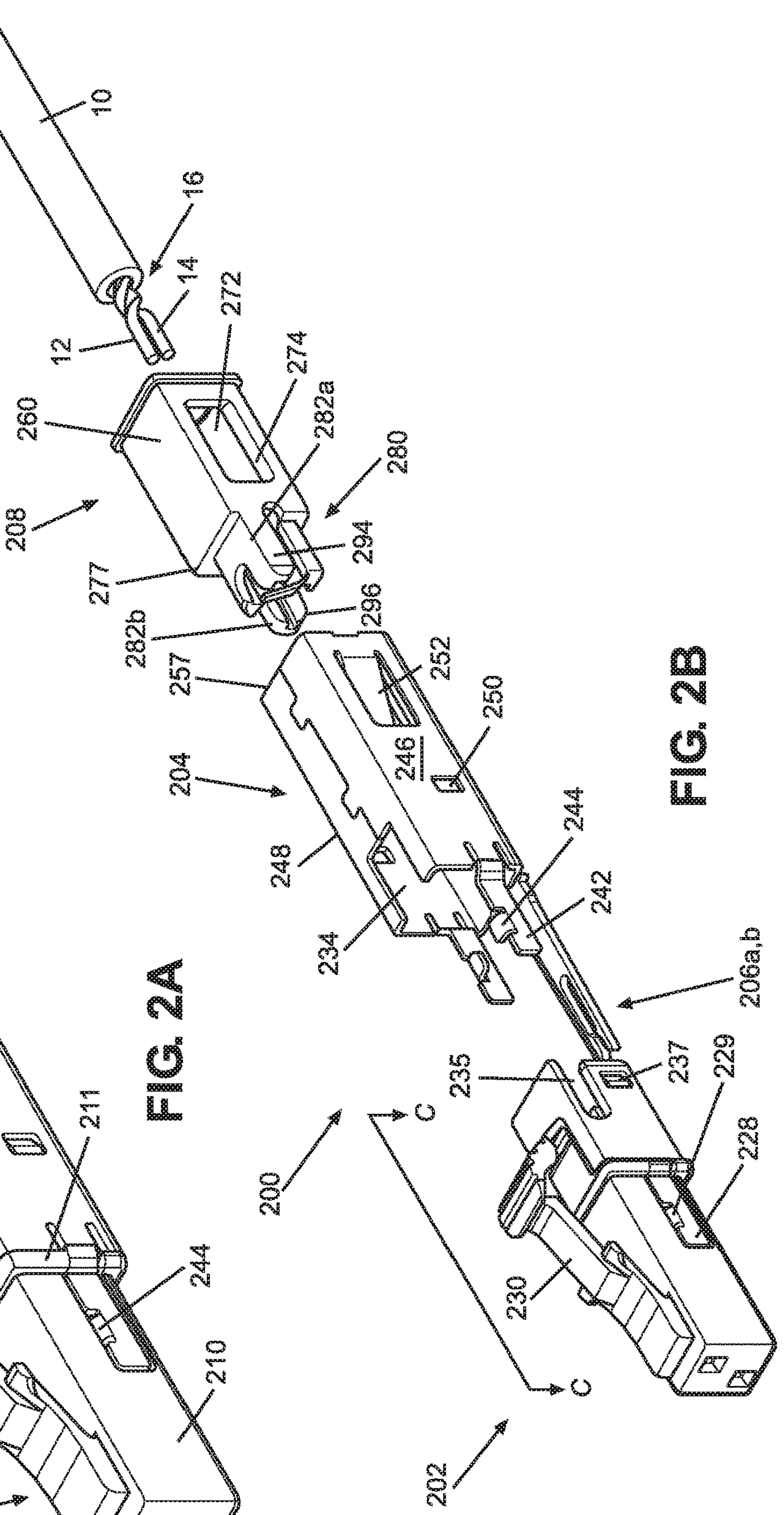
Figure 2C:
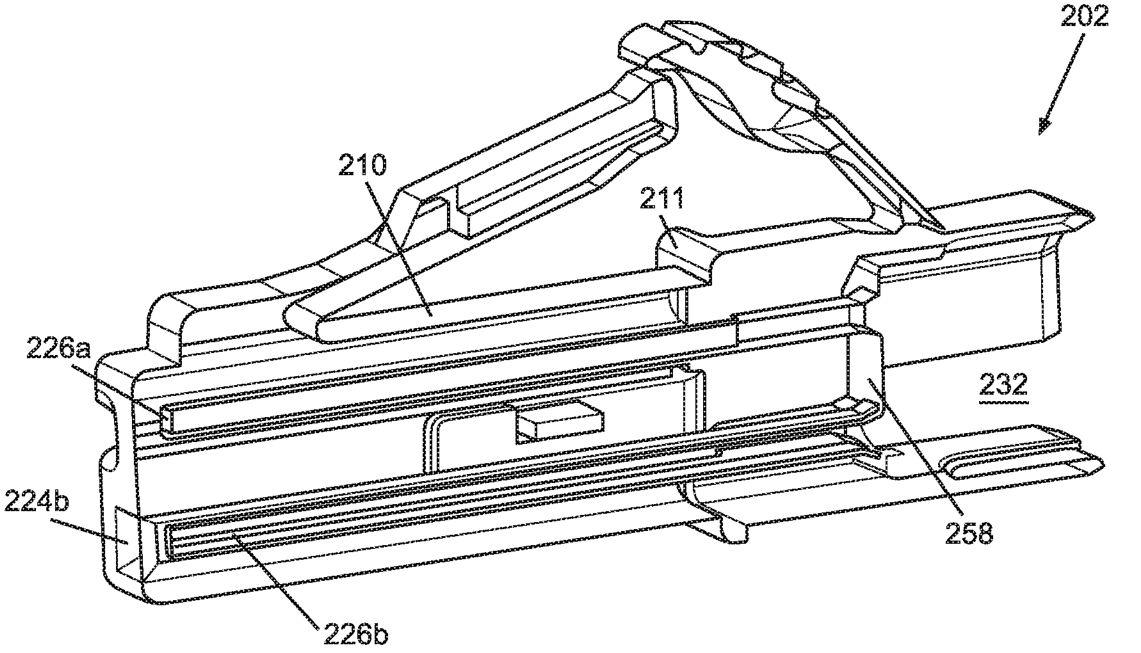
Figure 2D:
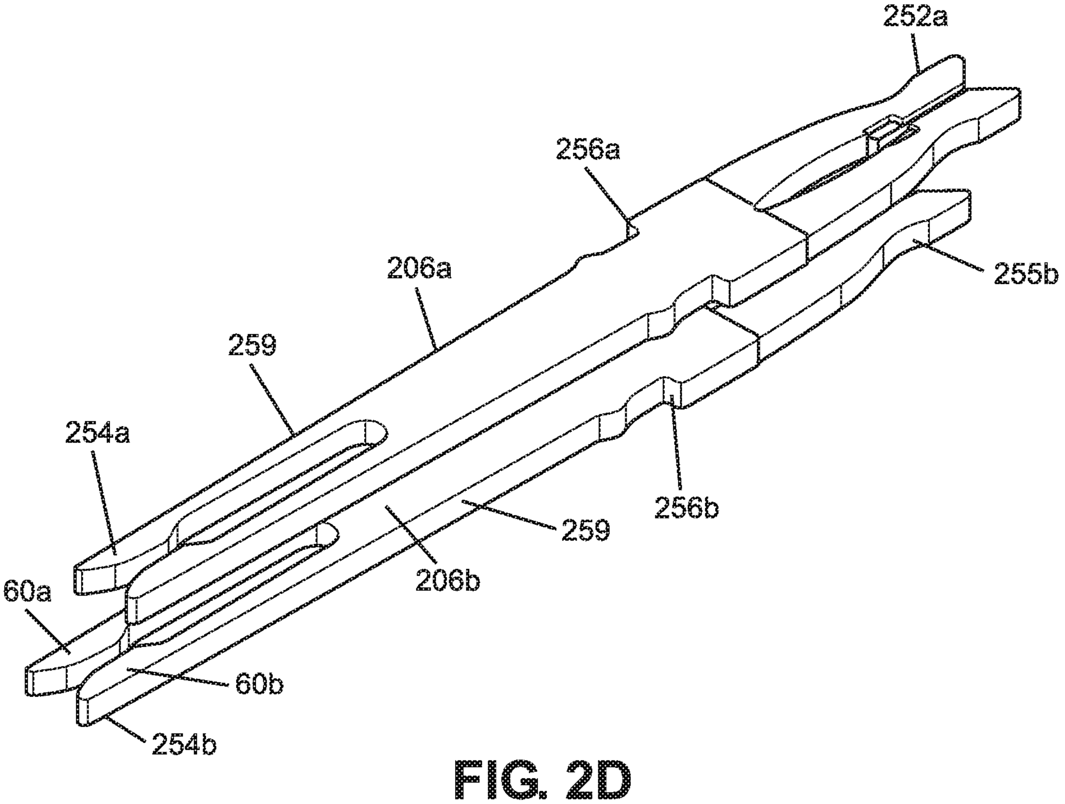

FIG. 1A illustrates two example embodiments of cables containing one or more single twisted pairs of conductors capable of transmitting electricity and/or data. The first cable 10 includes first and second conductors 12, 14 that are twisted together to form a single twisted pair 16. The conductors 12, 14 are enclosed by a protective jacket 18. The second cable 20 includes first through fourth conductors 22, 24, 26, 28. Conductors 22 and 24 are twisted together to form a first single twisted pair 30, and conductors 26 and 28 are twisted together to form a second single twisted pair 32. The twisted pairs 30 and 32 are separated by a separator 34, and are encased in a protective jacket 36. In certain example embodiments, the cables 10, 20 include a number of twisted pairs greater than two. In certain example embodiments, each single twisted pair of conductors, e.g., 16, 30, 32, is configured for data transmission up to 600 MHz (ffs) and has a current carrying capacity up to 1 A. Each single twisted pair of conductors, e.g., 16, 30, 32, can be connectorized with the various embodiments or combination of embodiments of free connectors and fixed connectors as described herein. FIG. 1B is an example of a shielded cable 40. The shielded cable 40 includes an outer jacket 42, a foil shield 44, a drain wire 46, and a single twisted pair 48 of conductors 50 and 52; each of the conductors 50 and 52 is provided with insulation 54.

Referring to FIGS. 2A-2D an example embodiment of a free connector 200 for a single twisted pair of electrical conductors is illustrated. Free connector 200 includes a forward connector body 202, a metal frame 204, a pair of electrical contacts **206*a*, 206*b* and a rear connector body 208. Free connector 200 can be coupled to a single twisted pair of conductors, e.g., conductors 12 and 14 of the single twisted pair 16 of cable 10**.

The forward connector body 202 includes an elongate forward portion 210 and a rear receiving portion 212 that is separated by a shoulder 211.

The elongate forward portion 210 of the forward connector body 202 includes a forward face 223 having a pair of offset openings **224*a*, 224*b* corresponding to contact receiving channels 226*a*, 226*b*; the openings 224*a*, 224*b* receive pin contacts that electrically interface with the tuning fork contacts 206*a*, 206*b*. In certain embodiments, a recess 228 is provided on each side face of the elongate forward portion 210 to interface with and retain the metal frame 204. Each recess 228 includes a recessed notch 229 to receive an interfacing tab 244 of the metal frame 204 to further ensure that the metal frame 204 remains secured to the forward connector body 202. The forward connector body 202 also includes a cantilevered latch 230**.

The rear receiving portion 212 of the forward connector body 202 is unitary (e.g. molded as a single unit) with the elongate forward portion 210 of the forward connector body 202. The rear receiving portion 212 defines a central cavity 232 that provides rear access to the contact receiving channels **226*a*, 226*b* of the elongate forward portion 210. Each side face 231, 233 of the rear receiving portion 212 includes a slot 235 to interface with the rear connector body 208 and an outward extending tab 237 to interface with the metal frame 204**.

The metal frame 204 of the free connector 200 comprises a metal shell body 240 having a central cavity 234 that is slidable over the rear receiving portion 212 of the forward connector body 202. The metal frame 204 is held in place about the rear receiving portion 212 through use of a pair of flex tabs 242 that interface with corresponding recesses 228 of the forward connector body 202. Each of the flex tabs 242 includes in inward facing tab 244 to interface with recessed notch 229 of the forward connector body 202. Each side face 246, 248 of the metal frame 204 includes an opening 250 to interface with outward extending tab 237 of the forward connector body 202. Each point of interface between the metal frame 204 and the forward connector body 202 assists in securing the metal frame 204 to the forward connector body 202. Each side face 246, 248 of the metal frame 204 is additionally equipped with an inward directed beam 252 (e.g. shield beam) to establish an electrical interface with a cable shield (foil or drain wire) of the cable carrying the single pair of conductors (e.g., see FIG. 1B). Note that, while the metal frame 204 includes a shield beam for interfacing with a shield of a shielded cable, the metal frame 204 can also be utilized in conjunction with a non-shielded cable. In the instance of a non-shielded cable, the metal frame provides additional structural support to the connector 200. In certain non-shielded uses, the frame 204 is alternatively made of a non-metal material, e.g., plastic.

Electrical contacts **206*a*, 206*b* each include a forward portion having a tuning fork receptacle contact 254*a*, 254*b* while a rear portion of each of the electrical contacts 206*a*, 206*b* includes an insulation displacement contact (IDC) 255*a*, 255*b*. Each tuning fork receptacle contact 254*a*, 254*b* includes a pair of opposing spring arms 60*a*, 60*b* presenting an angled opening to receive a pin contact. Each of the electrical contacts 206*a*, 206*b* includes a shoulder 256*a*, 256*b* that interfaces with a stop 258 (see FIG. 2C) within the elongate forward portion 210 of the forward connector body 202. The electrical contacts 206*a*, 206*b* include one or more tangs 259 to help retain each of the tuning fork receptacle contacts 254*a*, 254*b* within their respective contact receiving channels 226*a*, 226*b* of the forward connector body 202**.

The rear connector body 208 of the free connector 200 includes a rear body portion 260 that defines a central cavity 272 into which is inserted a pair of conductors (e.g., conductors 12, 14). Each side face is provided with an elongate opening 274 into which the inward directed beams 252 of the metal frame 204 extend wherein an electrical interface with the foil (or drain wire) of a conductor within the cavity 272 is established. A latch (now shown) on a lower face of the rear body portion 260 interfaces with a cut-out (not shown) of the metal frame 204 to secure the rear connector body 208 to the metal frame 204. A lip edge 277 of the rear body portion 260 seats against a rear face 257 of the metal frame 204.

The rear connector body 208 of the free connector 200 includes a contact receiving portion 280 that extends forward from the rear body portion 260. The contact receiving portion 280 is essentially divided into a first half 282*a* to accommodate the upper positioned electrical contact 206*a* and a second half 282*b* to accommodate the lower positioned electrical contact 206*b*. The first half 282*a* of the contact receiving portion 280 includes an upward channel that is contoured to direct the end of a conductor upward (e.g., a 90 deg. bend) to extend through a contact receiving slot. The second half 282*b* of the contact receiving portion 280 includes a downward channel that is contoured to direct the end of a conductor downward (e.g., a 90 deg. bend) to extend through a contact receiving slot.

The IDC contacts 255*a*, 255*a* of the electrical contact 206*a*, 206*b* are inserted into their respective contact receiving slots to establish an electrical interface with the conductor extending there through. The IDC contacts 255*a*, 255*b* applies a normal force to the respective conductor and cuts through both the insulation of the conductor and a portion of the conductor itself to create the electrical interface. Note that the electrical interface is established without requiring crimping of the conductor to the electrical contact, i.e. the electrical interface is crimp-less. The upward channel is, in part, defined by an upper outward extending arm 294 while the downward channel is, in part, defined by a lower outward extending arm 296. Each of upper outward extending arm 294 and lower outward extending arm 296 interface with respective corresponding slots 235 of the forward connector body 202 when the free connector 200 is assembled to assist in aligning and stabilizing the rear connector body 208 relative to the forward connector body 202.

Further details regarding the free connector 200 and/or a fixed connector 300 (described herein for reference) can be found in PCT Publication WO 2019/165466, entitled "Connectors and Contacts for a Single Twisted Pair of Conductors," and filed Feb. 26, 2019. The noted PCT Publication is hereby incorporated by reference in its entirety.

Figure 3A:
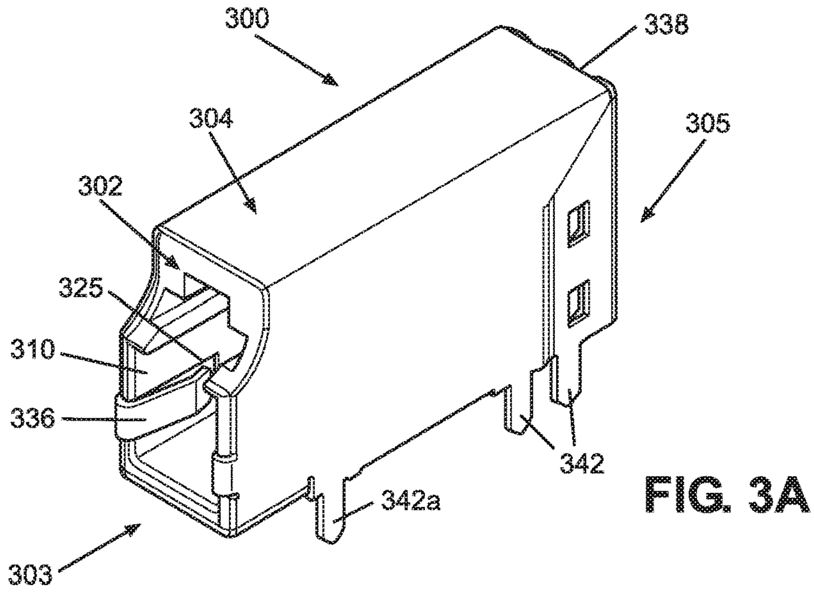
FIGS. 3A-3C illustrate an example embodiment of a fixed connector, which is configured to mate with the free connector of FIGS. 2A-2D, including an assembled perspective view, a front view and a pair of electrical contacts of the fixed connector, respectively.
Figure 3B:
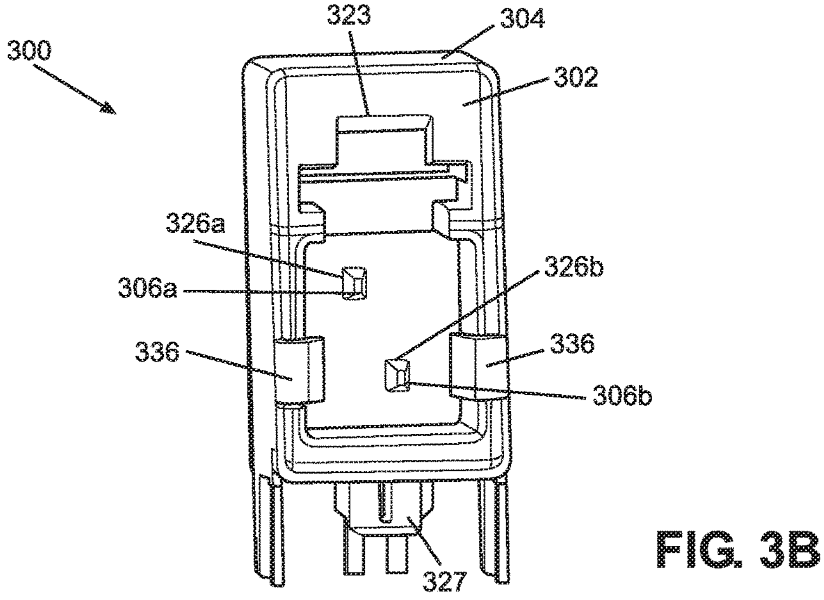
Figure 3C:
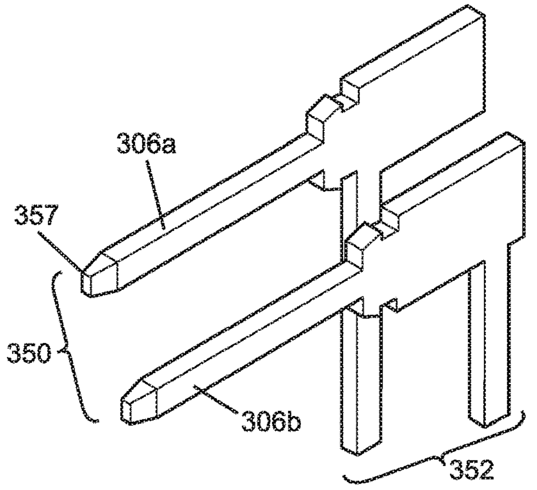

An example of a fixed connector 300, suitable to mate with free connector 200 is illustrated in FIGS. 3A-3C. The fixed connector 300 generally includes a housing body 302, a metal frame 304 and a pair of pin contacts 306*a*, 306*b* (straight or bent for board mounting). A forward end 303 and a rearward end 305 further define the fixed connector 300.

The housing body 302 of the fixed connector 300 includes a forward central channel 310 that receives the free connector 200. A notch 323 is provided within the housing body 302 to interface with the cantilevered latch 230 of the free connector 200. Further, side recesses 325 in each side face serve as an interface element for the metal frame 304. A mounting pin 327 extends from the housing body 302 and through the metal frame 2602 for circuit board mounting of the connector 300. The housing body further includes openings 326*a*, 326*b* to channels (not shown) into which the pin contacts 306*a*, 306*b* are inserted; when fully inserted, the pin contacts 306*a*, 306*b* extend into the forward central channel 310.

The metal frame 304 of the fixed connector 300 is a metal shell defining a central cavity that is slidable over the housing body 302. The metal frame 304 is held in place about the housing body 302 through use of a pair of clips 336 that interface with the side recesses 325. In certain embodiments, a back face 338 of the metal frame is enclosed with a back panel 340 while in other embodiments t back face 338 is left open. Further, in certain embodiments, the metal frame 304 is provide with one or more shield pins 342 that are insertable into vias in an application where the fixed connector 300 is board mounted.

Each of the pin contacts 306*a*, 306*b* of the fixed connector 300 include a forward portion 350 and a rear portion 352 that can be electrically coupled to a conductor, e.g. conductor 10, in any suitable manner. The forward portion 350 includes tapered faces that form a four-sided pyramid shape with a flattened apex 357; the flattened apex 357 having a rectangular or square cross-section.

Figure 4A:
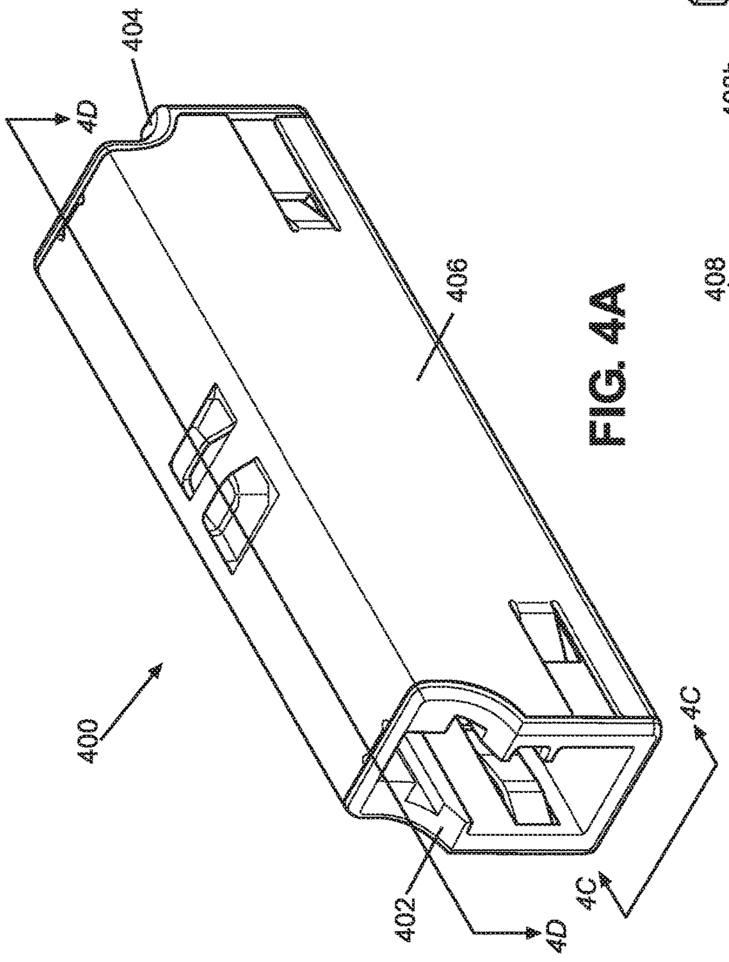
FIGS. 4A-4D illustrate an example embodiment of a shielded coupler including an assembled perspective, an exploded assembly perspective, a side cross-sectional, and a top cross-sectional view of the coupler, respectively.
Figure 4B:
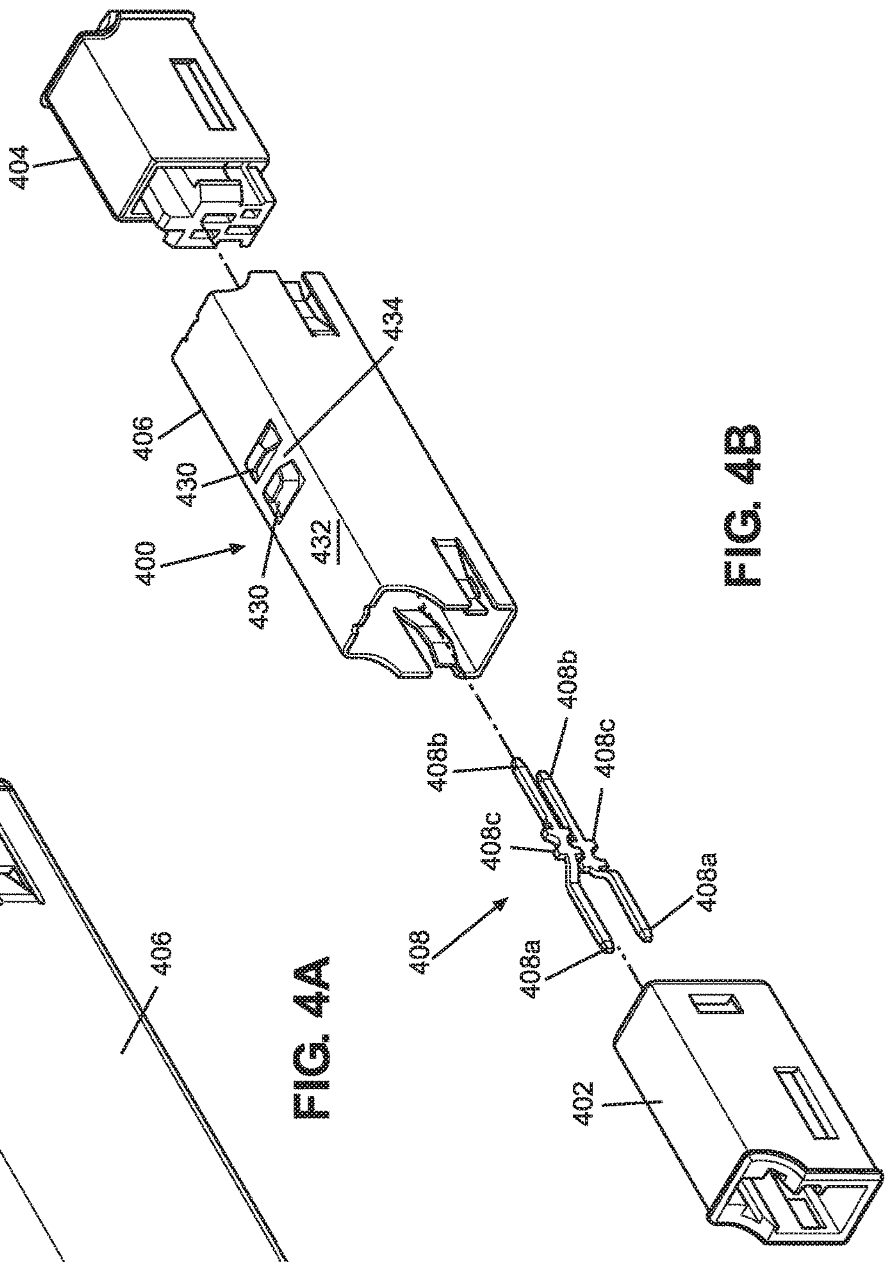
Figure 4C:
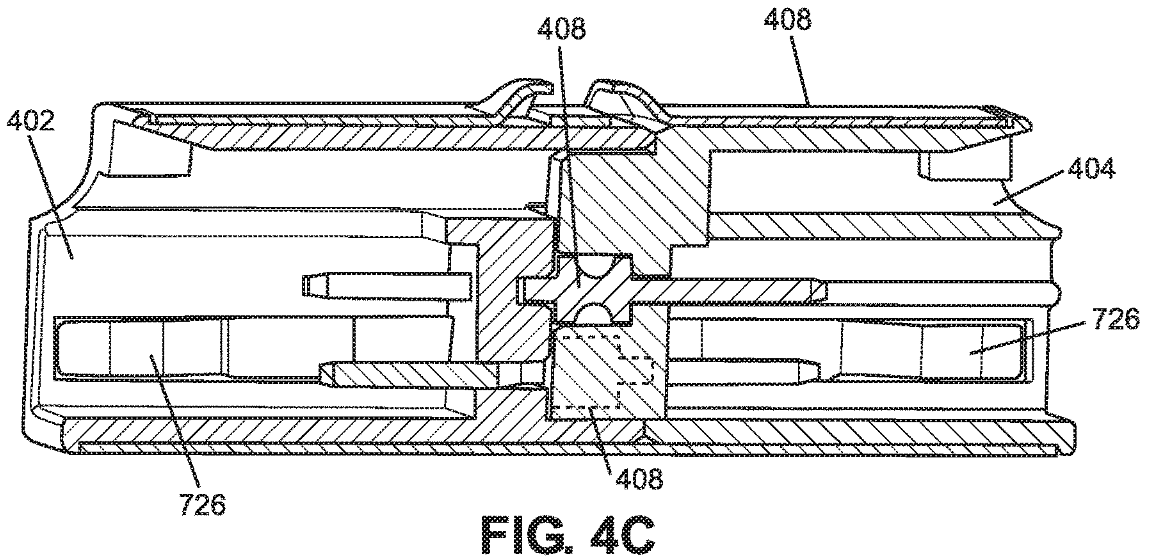
Figure 4D:
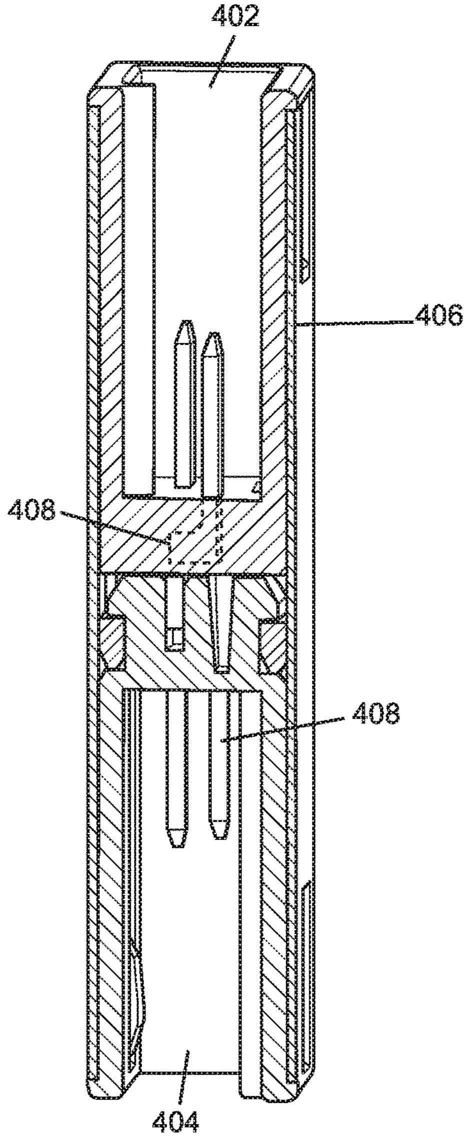
Figure 5A:
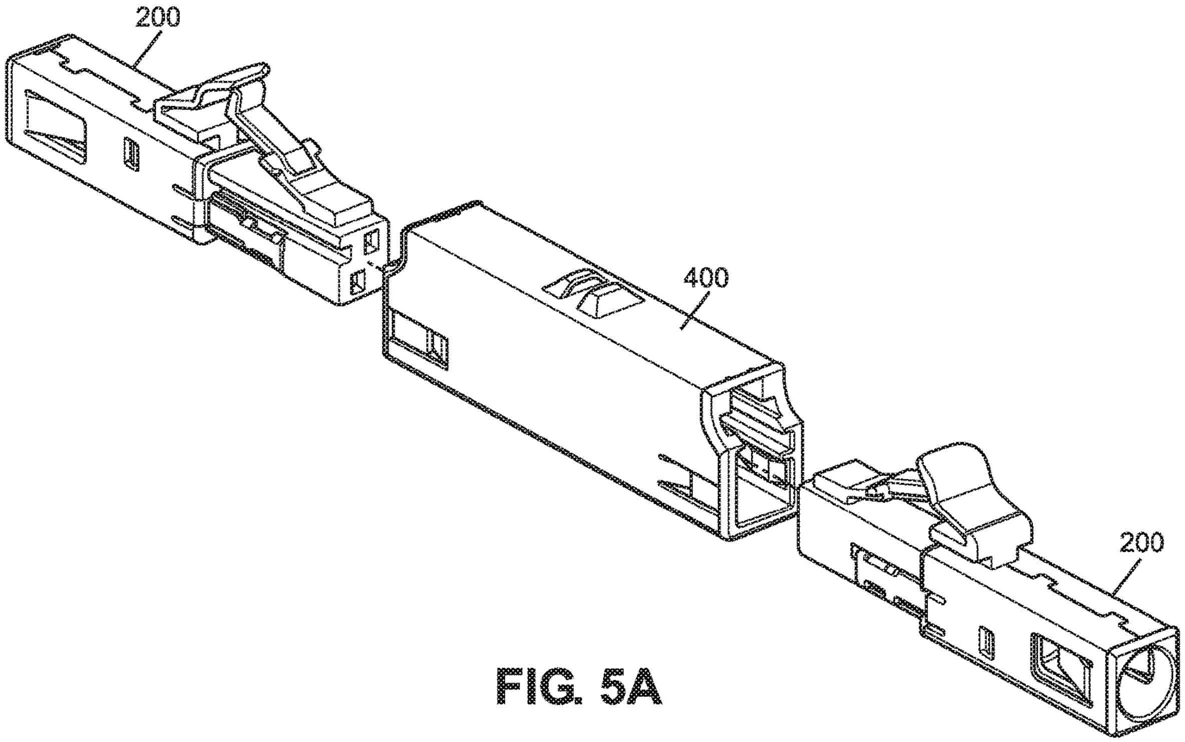
FIGS. 5A-5B provide perspective views of a pair of the connectors of FIGS. 2A-2D before and after electrical coupling with the coupler of FIGS. 4A-4D.
Figure 5B:
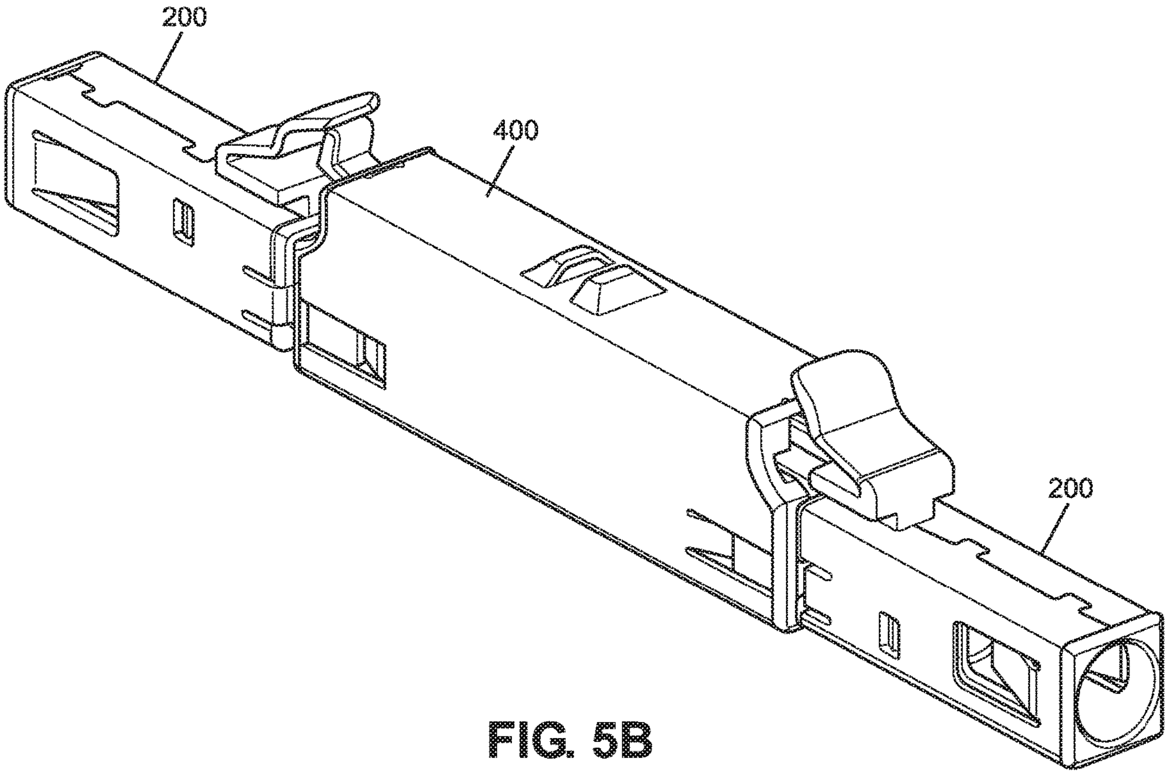

Referring to FIGS. 4A-4B an example embodiment of a coupler 400 is illustrated. As shown, the coupler 400 includes a first housing 402, a second housing 404, a metal shield 406 and a pair of contacts 408, each having a forward contact 408*a* and a rearward contact 408*b* separated by a central portion 408*c*. The first housing and second housing 402, 404 securely interface with one other to centrally support the first pair of contacts 408 enabling the first ends 408*a* of the contacts 408 to extend towards a first end 412 of the coupler 400 and the second ends 408*b* of the coupler 400 to extend towards a second end 414 of the coupler. FIGS. 4C and 4D provide cross-sectional views of the assembled coupler, including the metal shield 406, taken along lines 4C-4C and 4D-4D, respectively, of FIG. 4A, with each illustrating the placement of the first housing 402, the second housing 404, the metal shield 406 and the pair of contacts 408. FIGS. 5A and 5B illustrate the assembled coupler 400 with two of the free connectors 200 ready to be received by the coupler 400 and with the two connectors 200 removably received within the coupler 400 and electrically coupled, respectively. Each of the couplers 400 includes a pair of opposing projections 430 projecting away from a top face 432 of the coupler 400; the projections 430 define a channel 434. The projections 430 and channel 434 are used to position the coupler 400 in the high density panel 600 further described herein. Other coupler designs for coupling a pair of connectors, with each of the connectors coupled to exactly two electrical conductors, are also possible and can be used with the high density coupling panels described herein.

Figure 6:
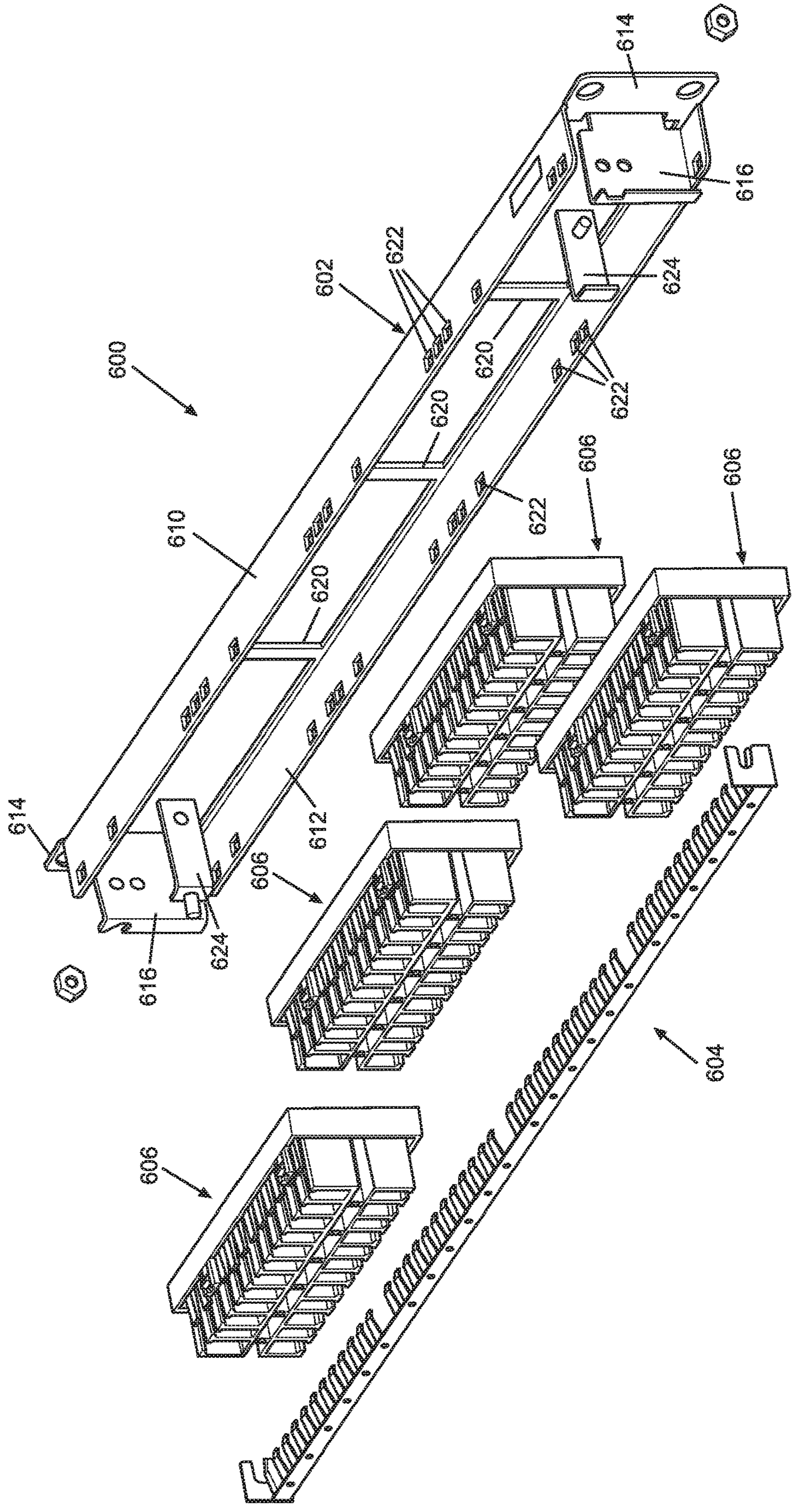
FIG. 6 is a rearward exploded assembly view of a high density coupling panel according to the present disclosure.
Figure 7A:
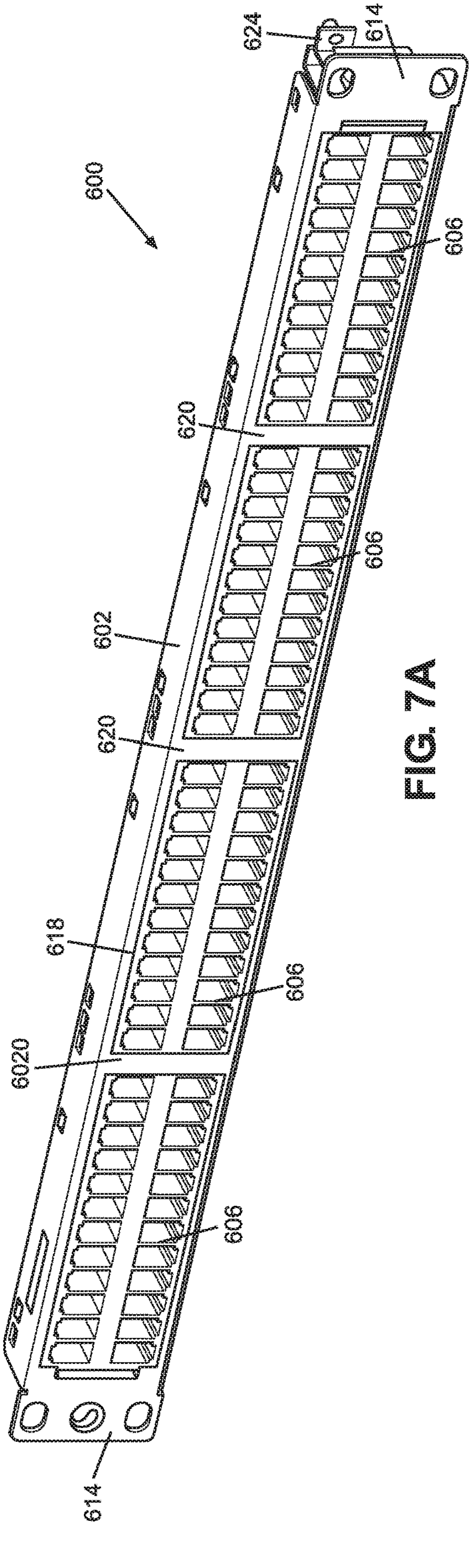
FIGS. 7A-7B provide forward and rearward assembled perspective view of the high density coupling panel.
Figure 7B:
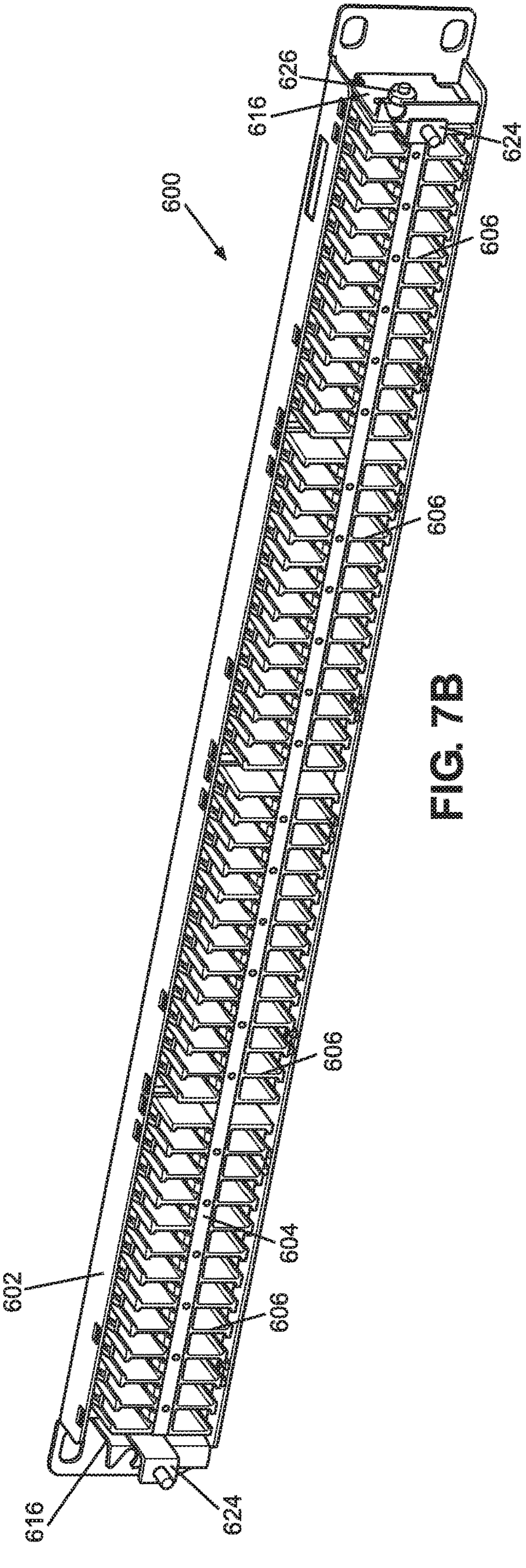

Referring to FIGS. 6 and 7A-7B the components of a high density coupling panel 600 according to the present disclosure. As shown, the high density coupling panel 600 includes a panel 602, a bonding strip 604 and a plurality of panel modules 606. Each of the panel 602 and bonding strip 604 are preferably manufacture from a metal material when they are to be utilized in an application requiring shielding. In a non-shielding application, the panel 602 can be manufactured from a non-metal material. The panel modules 606 are typically of a non-metal material.

The panel 602 includes an upper rail 610 and a lower rail 612 connected by outward extending side tabs 614 and rearward extending side walls 616. The upper rail 610, lower rail 612, side tabs 614 and side walls 616 define a forward face 618 that is divided by plurality of partitions 620 that extend between the upper rail 610 and the lower rail 612. Each of the upper and lower rails 610, 612 includes a plurality of openings 622 spaced along various locations of each of the rails 610, 612 to removably interface with a plurality of corresponding projections 942 (see FIG. 9B) extending outward from each of the panel modules 606 thereby retaining each of the plurality of panel modules 606 in position relative to the panel 602. In certain embodiments, the openings 622 of the panel 602 are located so as to be interfaceable with a plurality of different types of panel modules making the panel 602 a multi-use component. The panel 602 additionally includes a pair of metal shielding tabs 624 each of which is placed intermediate and in contact with the bonding strip 604 and the side walls 616 of the panel 602; a fastener (e.g., nut and bolt) 626 secures each shielding tab 624 to its respective side wall 616 of the panel 602. A ground wire (not shown) is coupled the shielding tab 624.

Figure 8A:
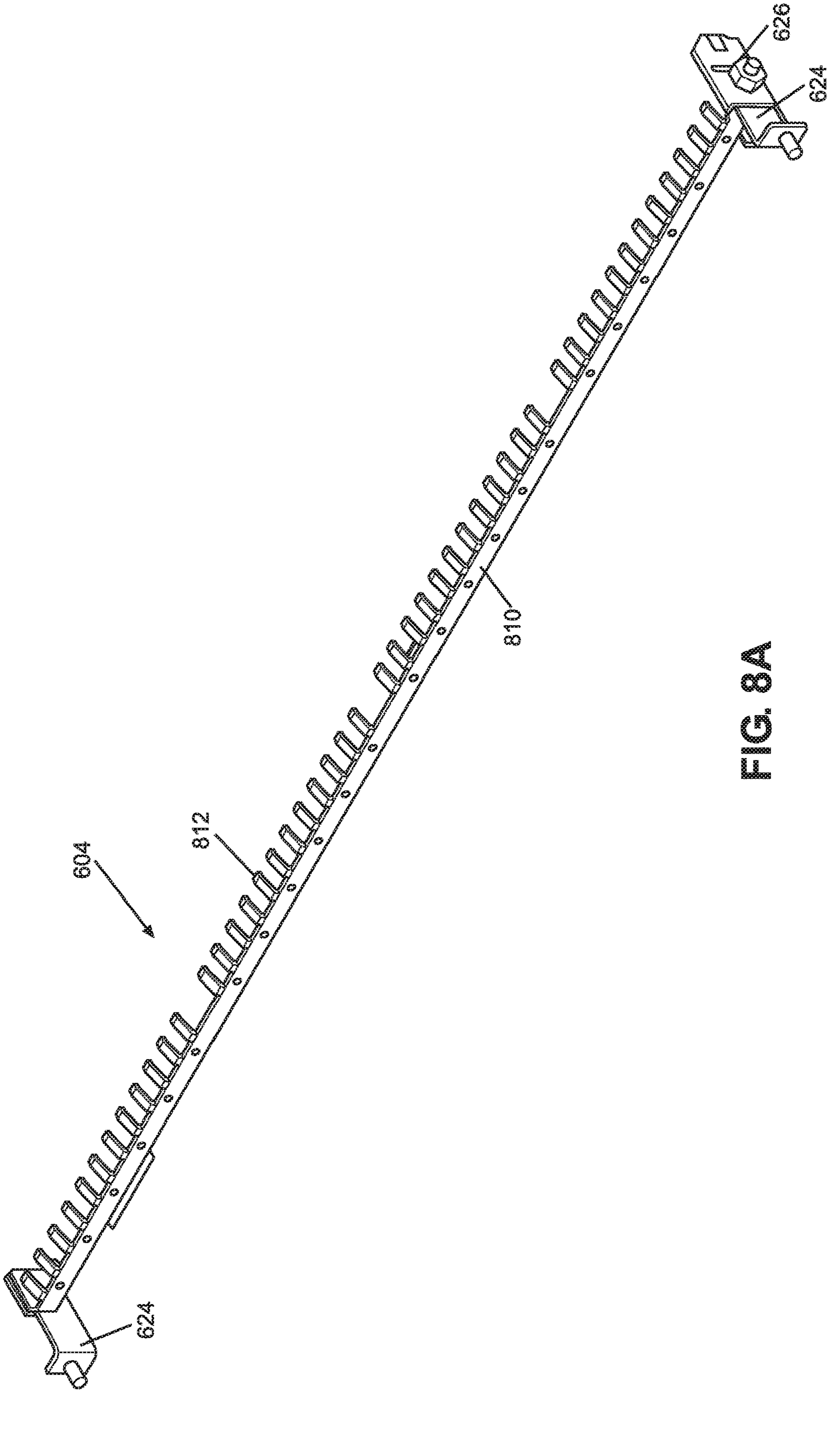
FIGS. 8A-8C illustrate a top perspective, bottom perspective and close-up perspective view of a bonding strip of the high density coupling panel.
Figure 8B:
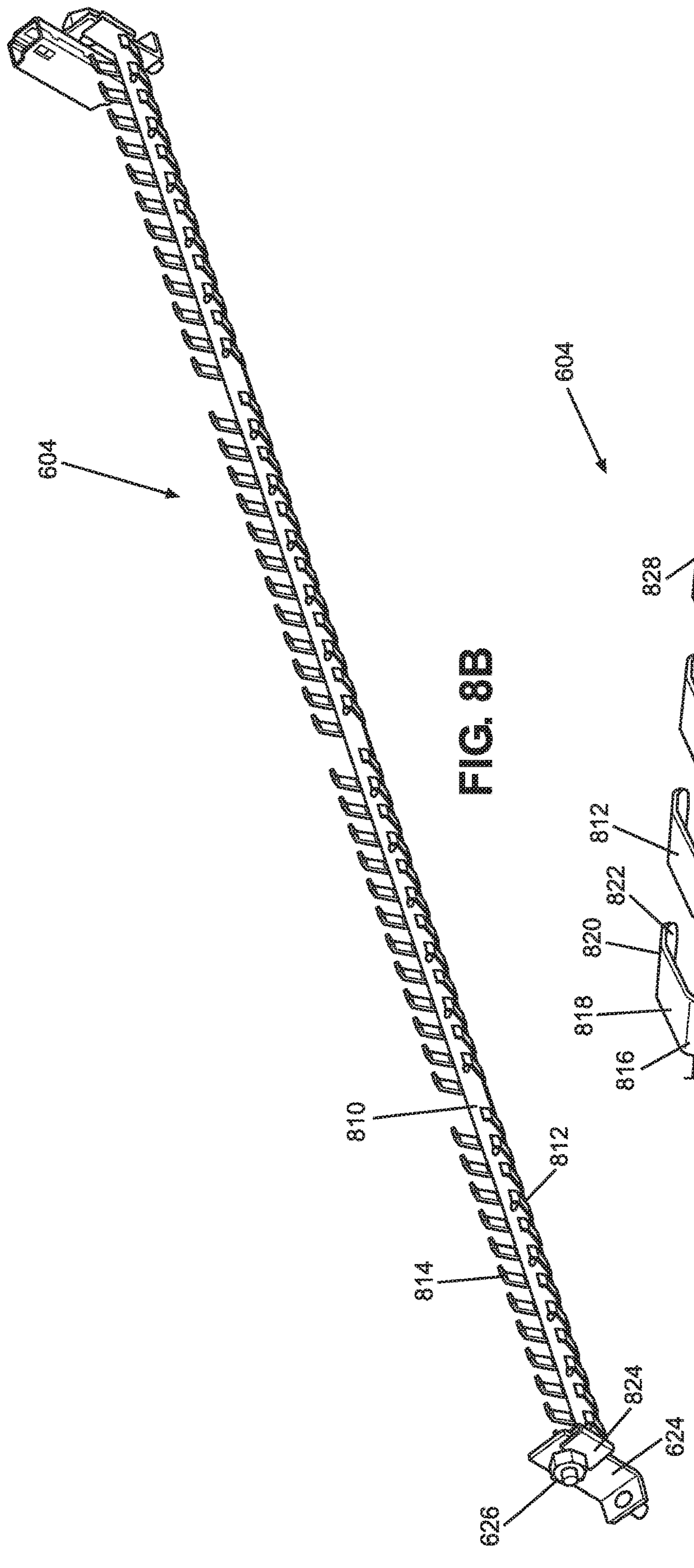
Figure 8C:
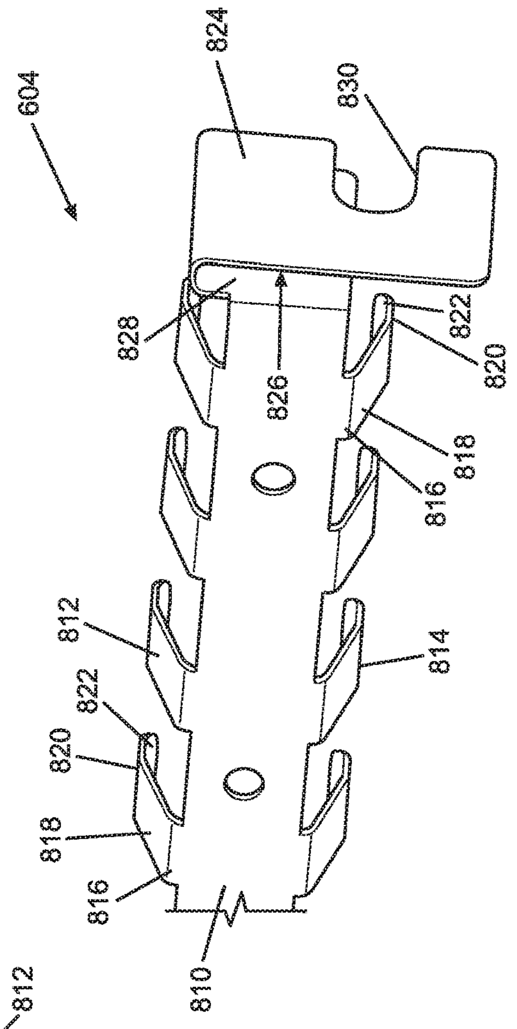

Referring to FIGS. 8A-8C additional details of the bonding strip 604 can be appreciated. As shown, the bonding strip 604 includes a central rail 810 supporting an upper row of outward extending tabs 812 and a lower row of outward extending tabs 814. Each of the tabs 812, 814 is in the form of a flex arm that flexibly extends from the central rail 810 from a base 816 proximate the central rail 810 into an angled arm portion 818 raising to a planar upper portion 820 then downward to a small forward face 822. Each end of the bonding strip 604 includes an outer side wall 824 that defines a channel 826 between itself and an inner side wall 828 of the central rail 810. When the high density coupling panel 600 is assembled, the channel 826 accommodates within, and rests atop, the shielding tab 624. The outer side wall 824 includes a cut-out 830 to accommodate a bolt of the fastener 626; the bolt extends through the panel 602, the outer side wall 824 of the central rail 810 and the shielding tab 624 serving to electrically couple them when secured in place with a bolt of the fastener 626. The central rail 810 of the bonding strip 604 additionally includes a plurality of openings 832 that interface with corresponding projections 936 of the various panel modules 606; the projections 936 serve to support the length of the bonding strip 604.

Figure 9A:
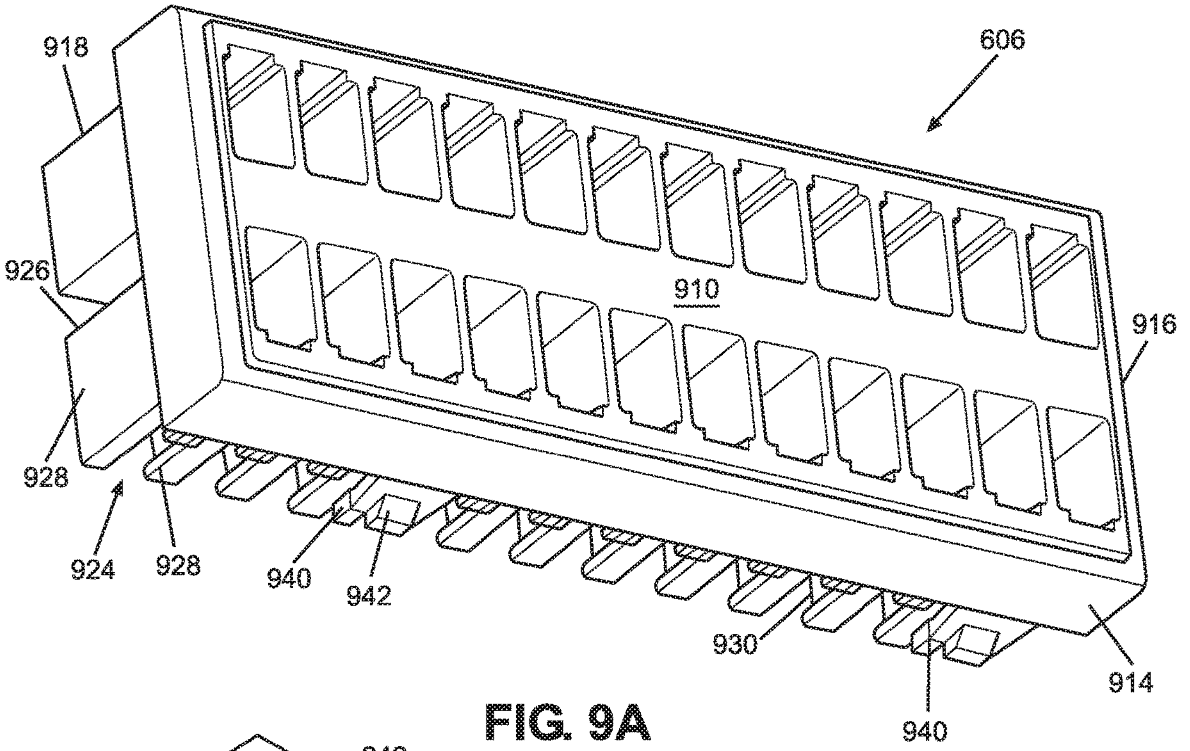
FIGS. 9A-9C providing a rearward perspective, forward perspective and up-close perspective view of a panel module of the high density coupling panel.
Figure 9B:
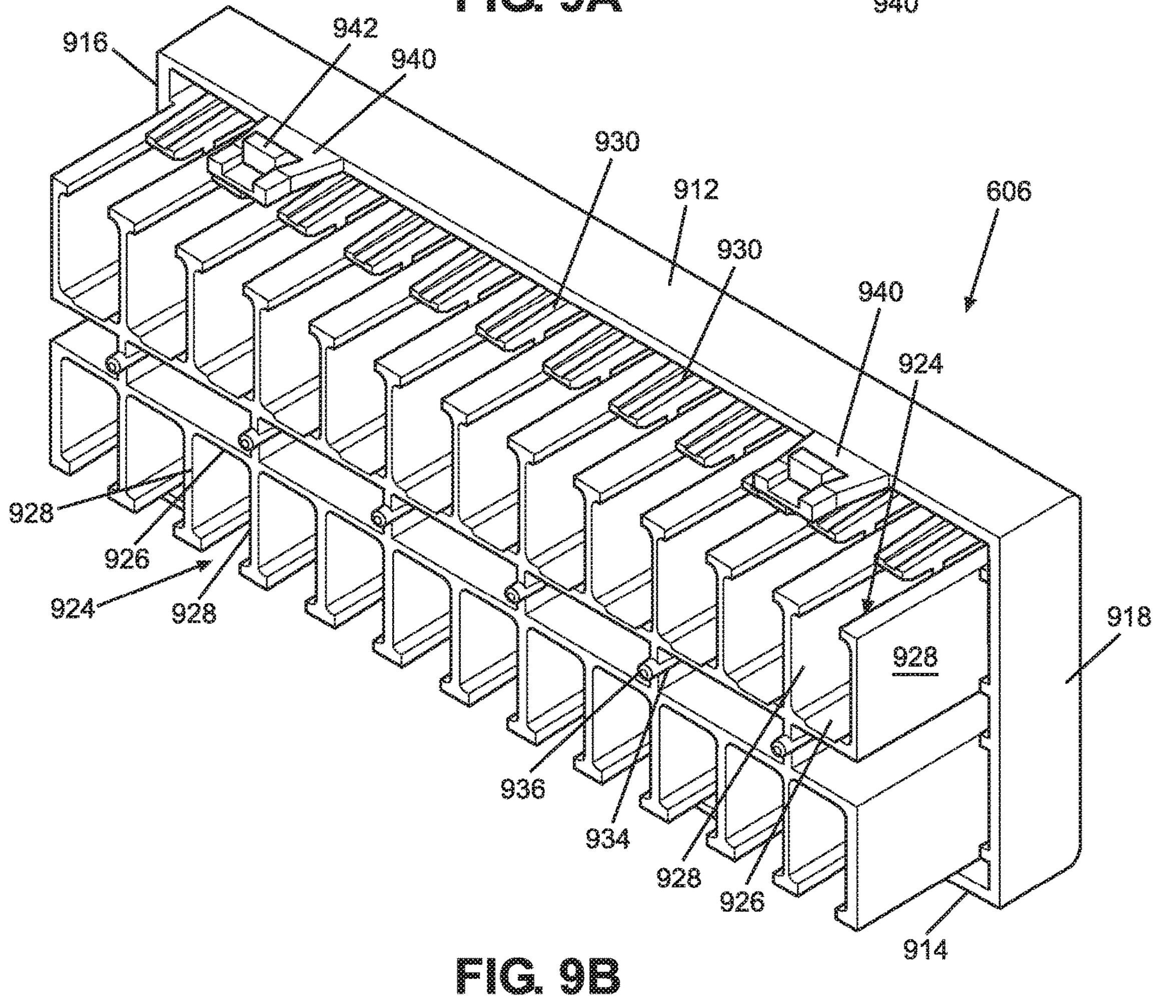
Figure 9C:
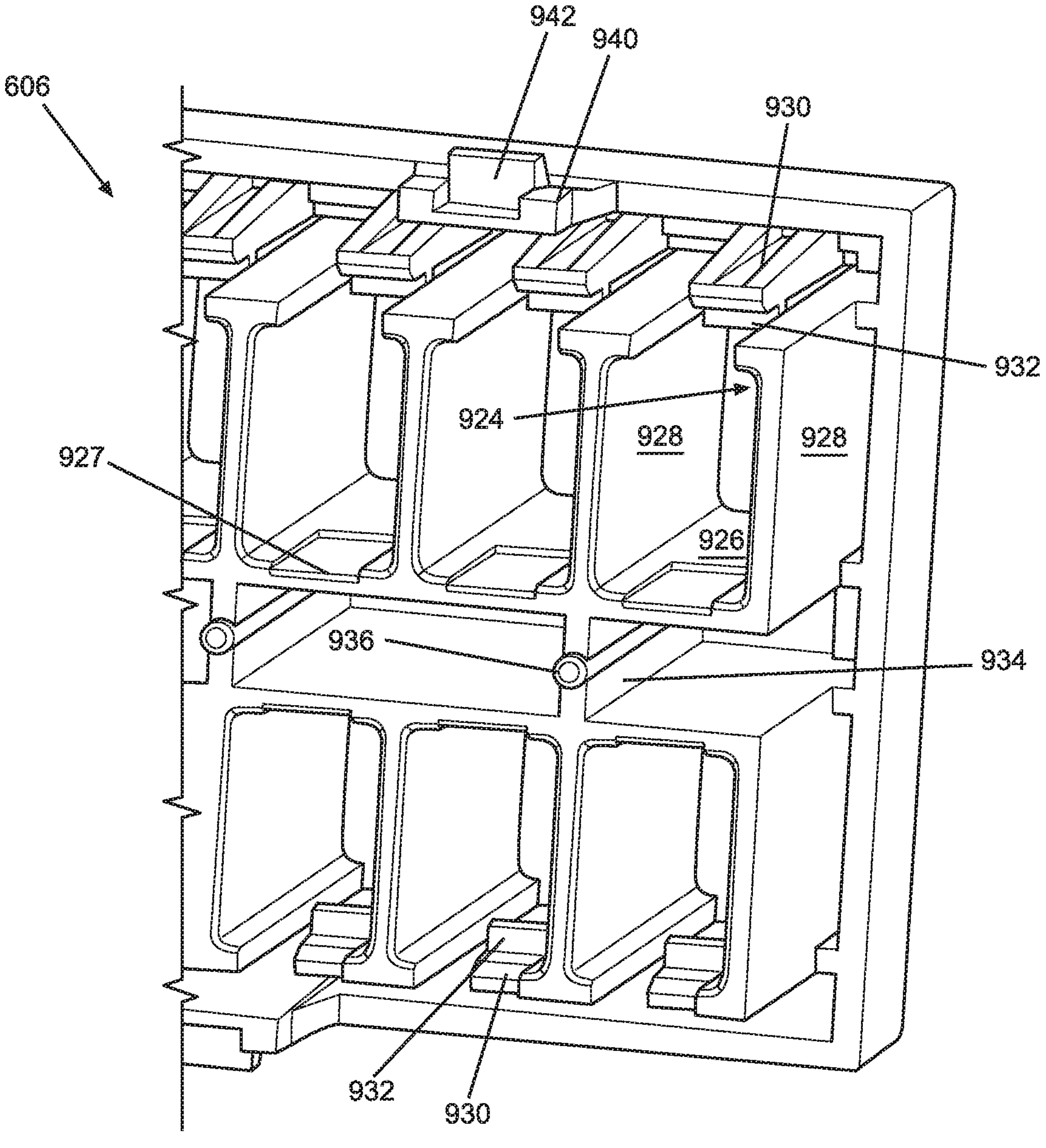

Referring to FIGS. 9A-9C additional details of the panel modules 606 can be appreciated. As shown, each of panel modules 606 includes a forward face 910 surrounded by an upper face 912, lower face 914 and side faces 916, 918. An upper row of a plurality of openings 920 and a lower row of a plurality of openings 922 are provided within the forward face 910. Extending away from each of the plurality of openings 920, 922 is a channel 924 defined by a central wall 926 and a pair of side walls 928. A recess 927 is provided in the central wall 926, proximate the rearward entry of the channel 924, to accommodate one of tabs 812, 814 of the bonding strip 604. A flex tab 930 is positioned over each of the channels 924 opposite the central wall 926. Projecting outward from the flex tab 930, and into the channel 924, is a bar 932. The bar 932 is received within the channel 434 (see FIG. 4B) defined by the projections 430 of the coupler 400 when the coupler 400 is received within the channel 924 of the panel module 606. Spacer walls 934 separate the upper channels 924 from the lower channels 924 and each spacer wall 934 includes a projection 936 to interface with corresponding opening 832 along the length of the central rail 810 of the bonding strip 604. A plurality of flexible latches 940 are integrated with the upper and lower faces 912, 914 and with projections 942 that extend away from the upper and lower faces 912, 914. The latches 940 flex enabling the panel modules 606 to be inserted into the panel 602 and, when in position, projections 942 interface with the openings 622 of the panel 602 to maintain a removably fixed position of the panel modules 606 relative to the panel 602.

It should be noted that, although the panel modules 606 are illustrated as having twelve upper channels 924 and twelve lower channels 924, each panel modules may include any number of channels in one or a plurality of rows as would be suitable to a particular application. Further, it should be noted that the panel 602 and bonding strip 604 can be configured to accommodate any number of panel modules 606.

Figure 10B:
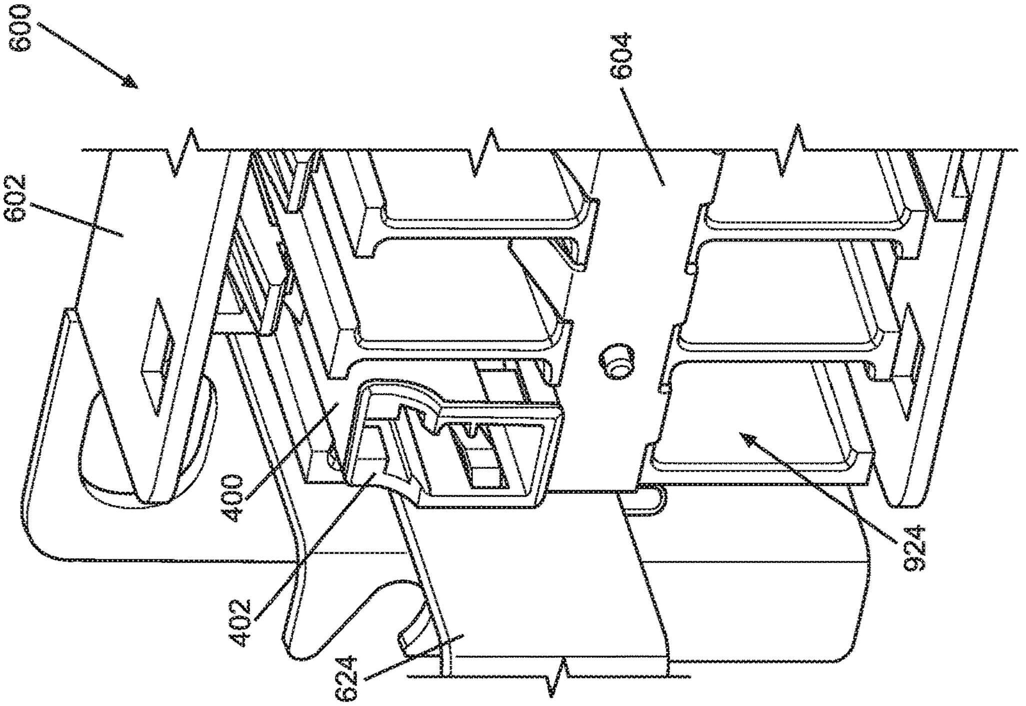
FIGS. 10A-10E provide various perspective views of the coupler interfacing with the high density coupling panel.
Figure 10A:
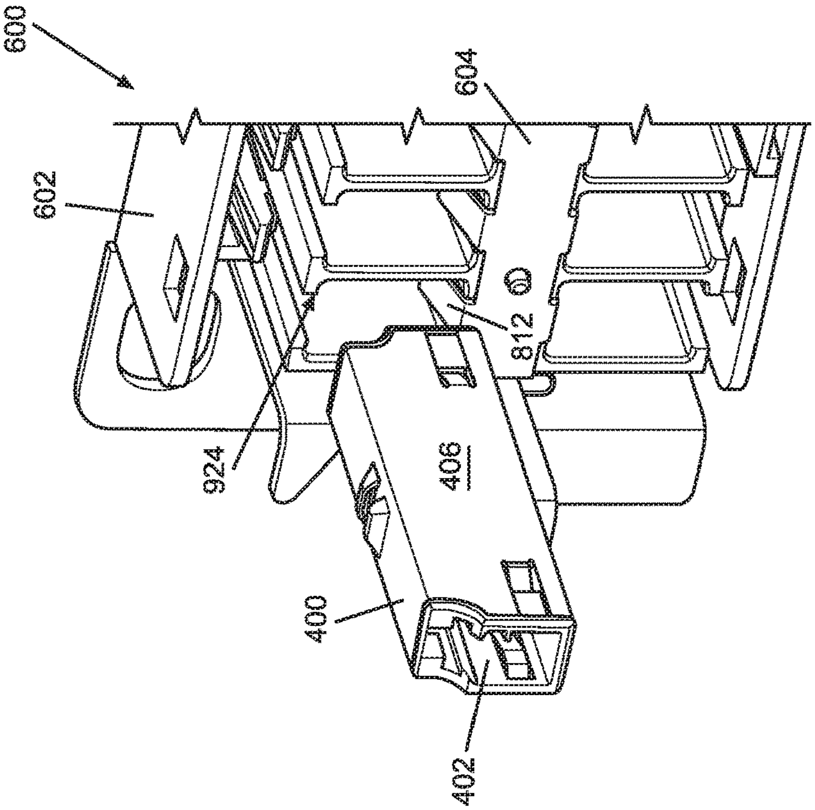
Figure 10C:
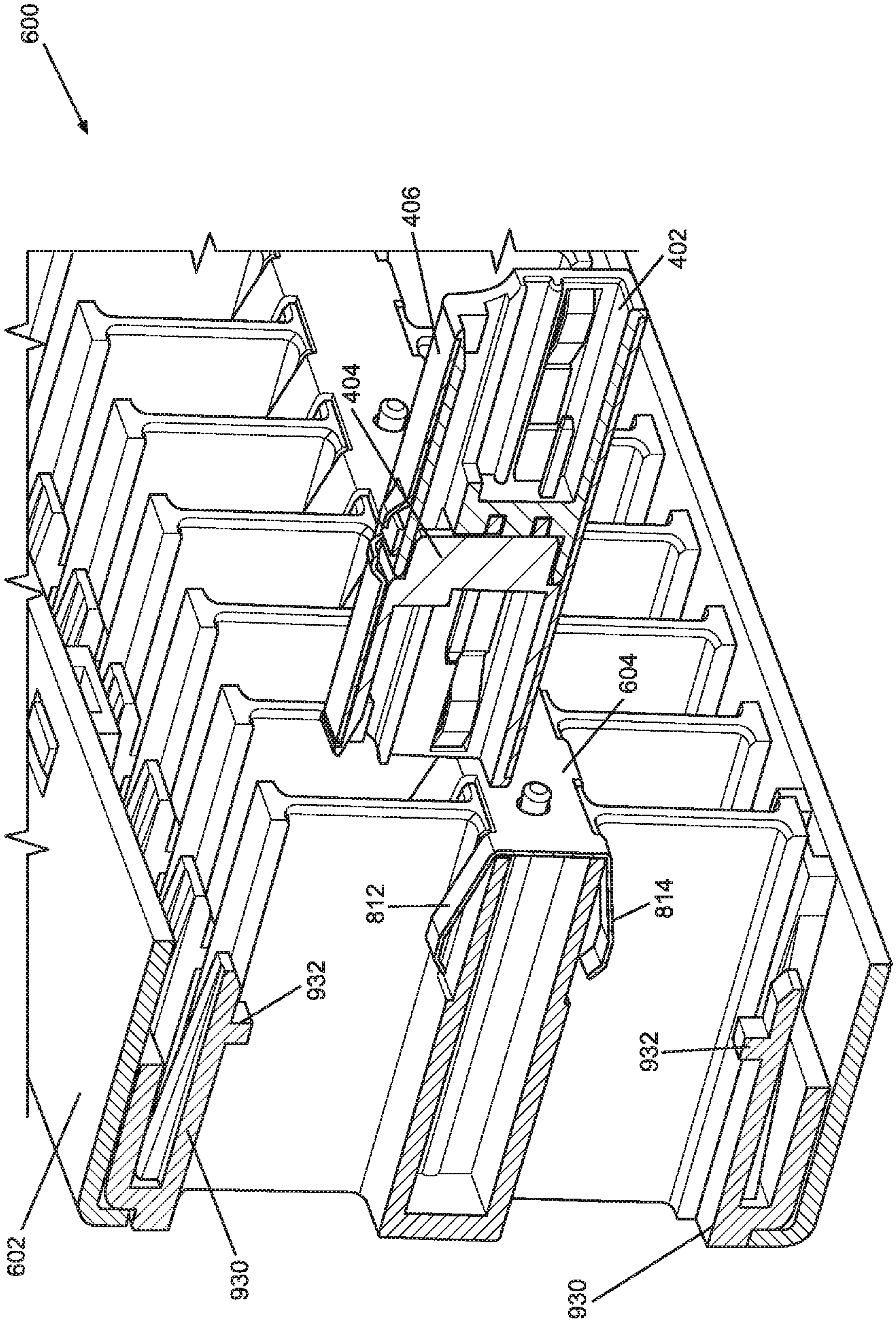
Figure 10E:
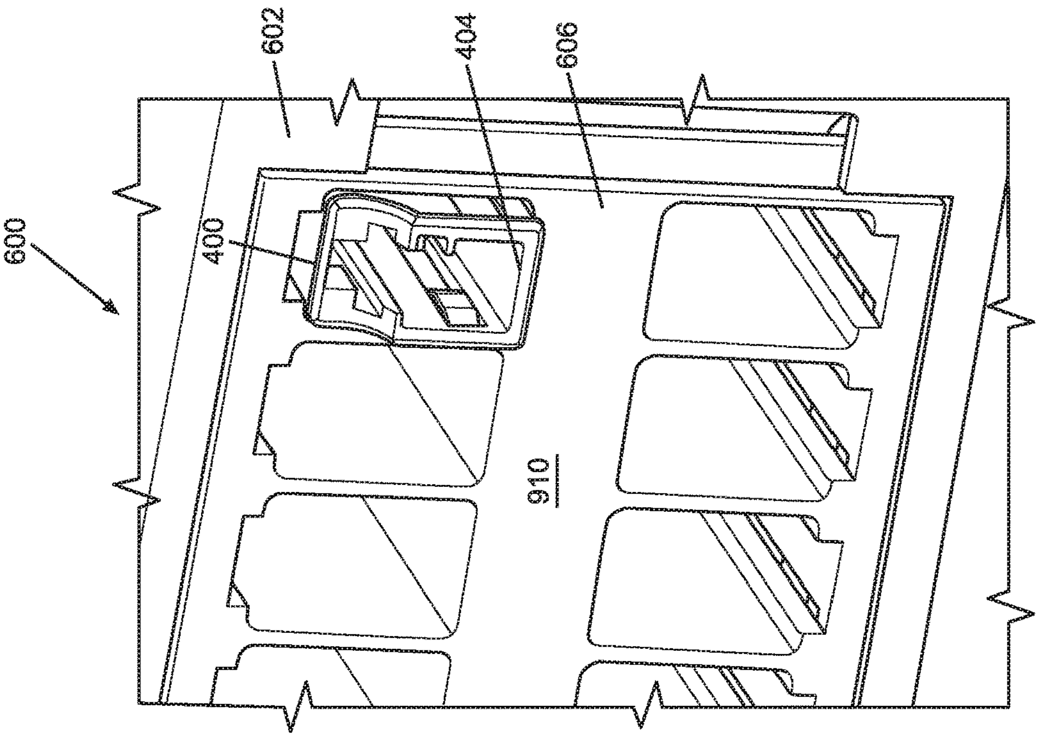
Figure 10D:
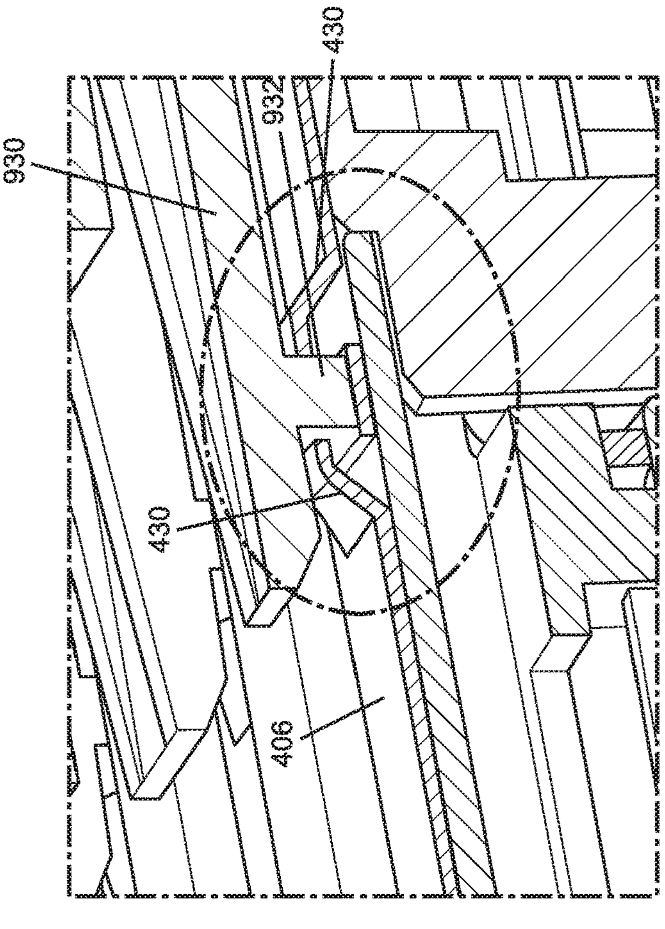

FIGS. 10A-10E illustrate various features of the assembled high density coupling panel 600 in relation to the coupler 400. In an assembled configuration, the panel modules 606 have been pushed into a removably interlocking position with the panel 602. Further, the bonding strip 604 is in place, supported by the panel modules 606 and secured to the panel 602 and shielding tab 604. The tabs 812, 814 of the bonding strip 604 are in position over the recess 927 of their respective channel 924 of the panel module 606. Upon insertion of the coupler 400 into the respective channel of the panel module 606, the metal shield 406 of the coupler 400 will electrically interface with the tab 812 of the bonding strip; the recess 927 of the channel 924 allows the tab 812 to flex relative to the metal shield 406 of the coupler 400. FIG. 10B illustrates the coupler 400 fully inserted within the channel 924 of the panel module 606. FIG. 10C provides a cross-sectional view of a coupler 400 being inserted into the channel 924 of the panel module illustrating the location of the bonding strip tabs 812, 814. FIG. 10D is a close-up view of the interface between the tab 930/bar 932 of the panel module 606 and the projections 430 of the coupler 400. FIG. 10E provides a view of the front face 910 of the panel module with the coupler 400 fully inserted. In certain embodiments, as shown, both forward and rearward ends of the coupler 400 extended beyond the boundaries of the panel module 606.

Figure 11:
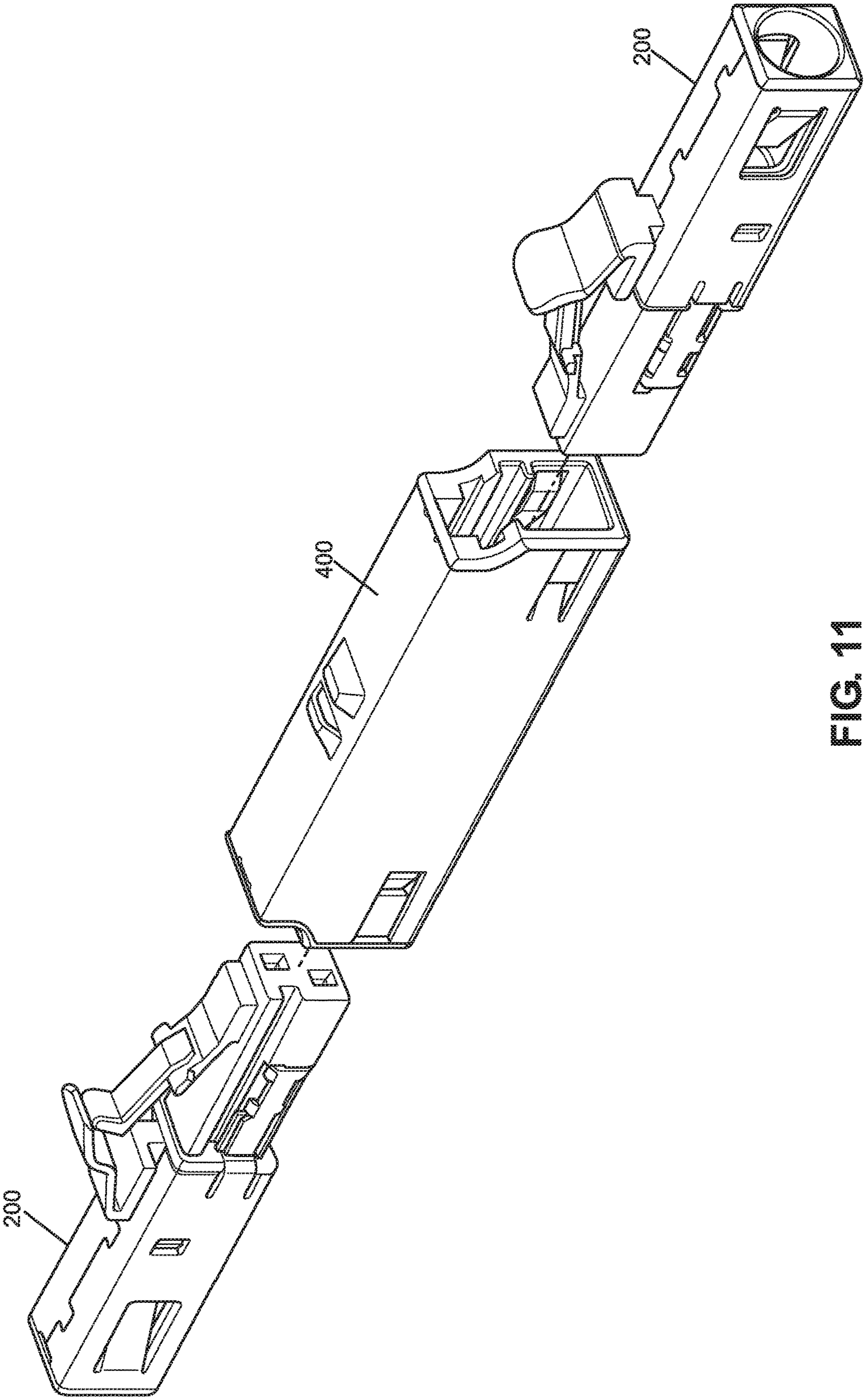
FIG. 11 is a perspective view of the coupler positioned to receive first and second free connectors.

Once in place within the respective channel 924 of the panel module 606, the coupler 400 is ready to receive first and second free connectors 200, see FIG. 11 which illustrates the coupler 400 ready to receive both a first free connector 200 and a second free connector 200.

Figure 12A:
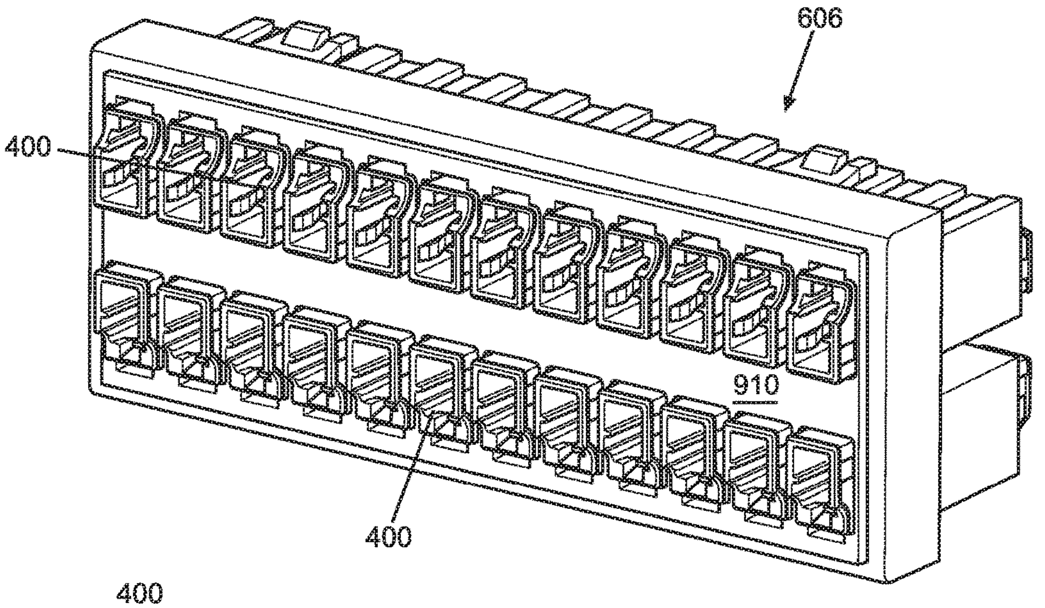
FIGS. 12A-12C provides a front perspective, a rear perspective, and a cross-sectional view, respectively, of a modular panel of the high density coupling panel fully loaded with a plurality of couplers.
Figure 12B:
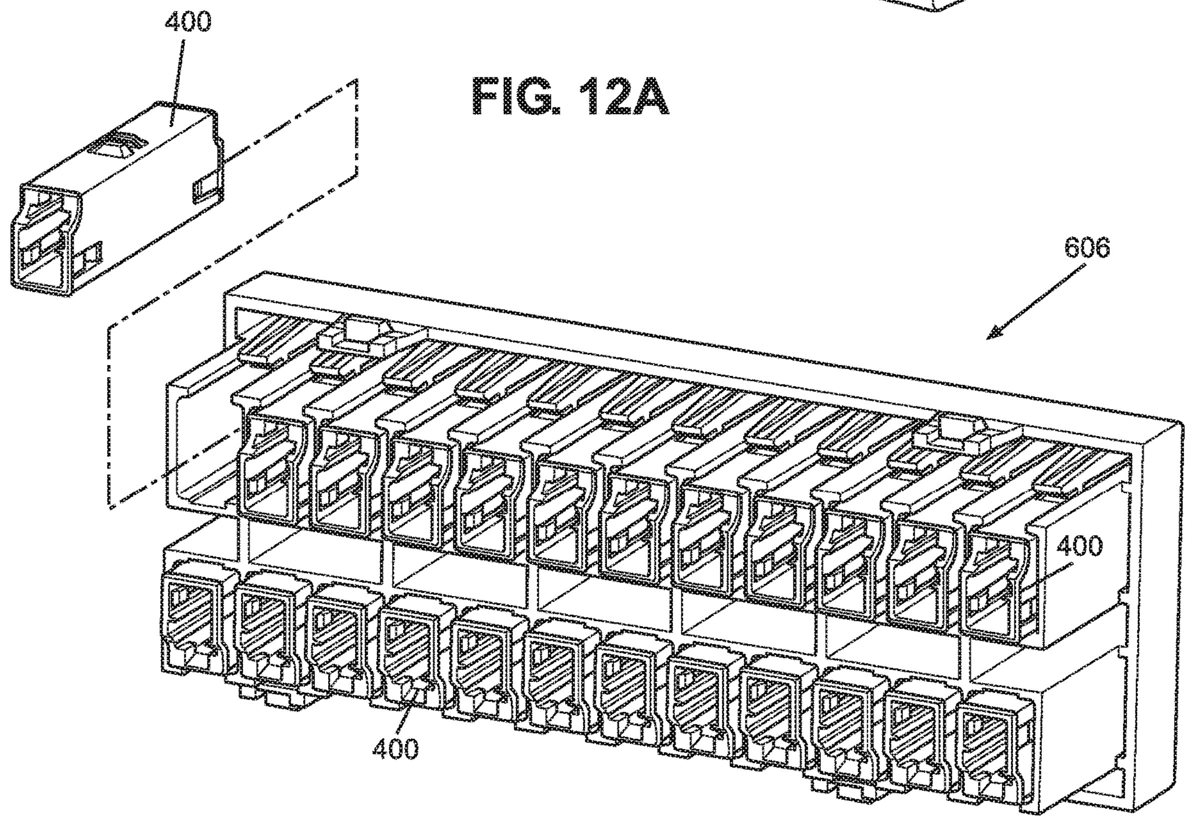
Figure 12C:
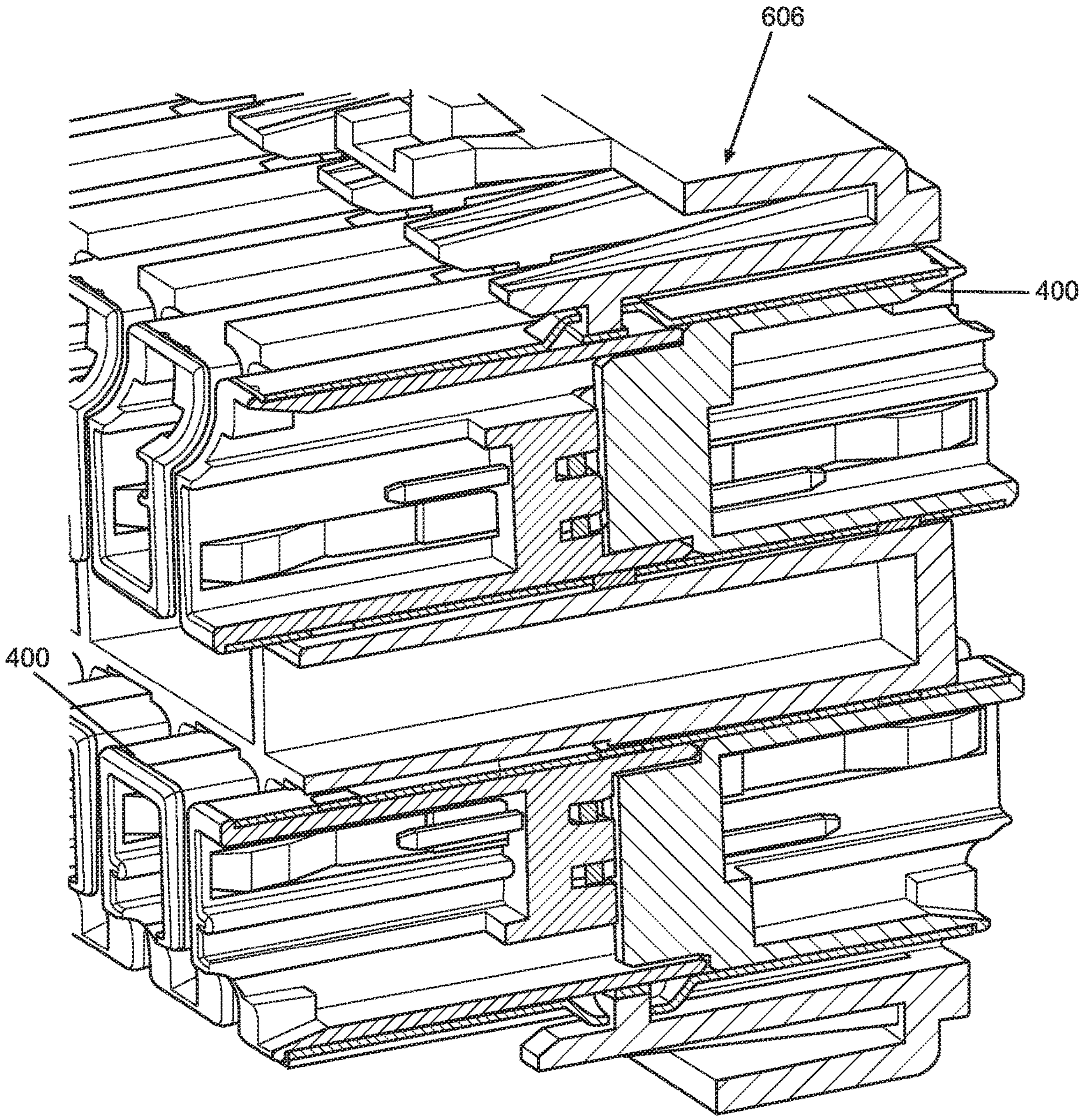

FIGS. 12A-12C illustrate panel modules 606 of the high density coupling panel 600 fully loaded with couplers 400 and ready to be inserted into the panel 602 of the high density coupling panel 600.

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. Note that features of one or more embodiments can be incorporated in other embodiments without departing from the spirit of the invention. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Spatially relative terms, such as “under”, “below”, “lower”, “over”, “upper”, “top”, “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A high density coupling panel, comprising:
- a panel module having a plurality of channels;
- a coupler inserted within each of the plurality of channels, wherein each coupler includes exactly one pair of electrical and data coupling contacts;
- a metal panel that receives the panel module; and
- a bonding strip that is electrically coupled to each coupler and to the metal panel;
- wherein the plurality of channels are presented in an upper row and lower row configuration, the upper and lower rows of channels are separated by a spacer wall, and the spacer wall includes a projection that supports the bonding strip.

2. The high density panel of claim 1, wherein the bonding strip includes upper and lower tabs that extend into each of the upper and lower rows of channels.

3. The high density panel of claim 2, wherein each channel includes a recess to accommodate the upper or lower tab that extends into the respective channel.

4. The high density panel of claim 1, wherein the panel module suspends a latch over each of the plurality of channels and wherein the latch interfaces with the coupler to releasably retain the coupler in a position relative to the panel module.

5. A panel module of a high density panel, comprising:
- a front face including a plurality of coupler openings;
- a channel extending rearward from each of the plurality of coupler openings; and
- a flex tab extending rearward from each of the plurality of coupler openings and positioned over a corresponding channel,
- wherein the channel receives a coupler for coupling first and second connectors, the coupler including exactly two contacts for transmitting both power and data between the first and second connectors, and
- wherein the flex tab interfaces with the coupler to retain the coupler within the channel.

6. The panel module of claim 5, wherein the plurality of coupler openings are arranged in a plurality of rows.

7. The panel module of claim 5, wherein the flex tab interfaces with the coupler via a cross-wise bar on the flex tab that is received within a retaining channel of the coupler.

8. The panel module of claim 7, wherein the retaining channel of the coupler is defined by a plurality of projections extending outward from a housing of the coupler.

9. The panel module of claim 5, wherein the panel module further comprises a plurality of projections extending rearward from the plurality of coupler openings beyond a rearward depth of the channel, the projections supporting a bonding strip.

10. The panel module of claim 9, wherein the channel includes a recess to receive a tab extending from the bonding strip.

11. A method of assembling a high density coupling panel, comprising:
- inserting a panel module into a panel until the panel module is secured within the panel by a mechanical interface between the panel module and the panel, wherein the panel module includes a plurality of channels;
- inserting into each of the plurality of channels a coupler until the coupler is secured within the channel by a mechanical interface between the coupler and the panel module, wherein each coupler includes exactly two electrical and data coupling contacts; and
- electrically coupling the coupler to the panel by securing a conductive bonding strip to the panel, the conductive bonding strip including a plurality of openings that interfaces with a plurality of corresponding projections on the panel module.

12. The method of claim 11, wherein the coupler includes a non-conductive housing.

13. The method of claim 11, wherein the coupler includes a conductive housing.

14. The method of claim 13, wherein the conductive bonding strip electrically interfaces with the conductive housing of each of the couplers via a tab extending from the conductive bonding strip, the tab being positioned intermediate the coupler and the channel of the respective coupler.

15. The method of claim 11, wherein the panel module is releasably received within the panel, the panel accommodating different types of panel modules.

16. The method of claim 11, wherein the coupler is releasably received within the panel module, and wherein the panel module accommodates the coupler regardless of the coupler having a conductive or non-conductive housing.

* * * * *